(12) United States Patent
Toyofuku et al.

(10) Patent No.: US 6,661,455 B1
(45) Date of Patent: Dec. 9, 2003

(54) ELECTRONIC PHOTOGRAPHING DEVICE FOR PANORAMIC PHOTOGRAPHING AND EDITING

(75) Inventors: Toshiyuki Toyofuku, Hachioji (JP); Masafumi Yamasaki, Hachioji (JP); Nobuhide Dotsubo, Daito (JP); Toshinobu Haruki, Kyotanabe (JP); Hideto Hayashi, Daito (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/096,030

(22) Filed: Jun. 11, 1998

(30) Foreign Application Priority Data

Jun. 13, 1997  (JP) .............................................. 9-157083

(51) Int. Cl.[7] .............................. H04N 5/76; H04N 7/00; H04N 5/225; H04N 5/222; G06K 9/36
(52) U.S. Cl. .................... 348/231.6; 348/36; 348/218.1; 348/333.04; 382/284
(58) Field of Search ............................... 348/36, 37, 39, 348/218.1, 333.02, 333.04, 333.05, 239; 382/284; 346/231.6, 231.2, 231.3

(56) References Cited

U.S. PATENT DOCUMENTS

| 5,541,656 | A | * | 7/1996 | Kare et al. .............. 348/333.02 |
| 5,650,813 | A | * | 7/1997 | Gilblom et al. ................ 348/36 |
| 5,666,459 | A | * | 9/1997 | Ohta et al. .................... 348/39 |
| 5,682,197 | A | * | 10/1997 | Moghadam et al. .......... 348/36 |
| 5,699,108 | A | * | 12/1997 | Katayama et al. ..... 348/333.02 |
| 5,790,183 | A | * | 8/1998 | Kerbyson .................... 348/37 |
| 5,898,434 | A | * | 4/1999 | Small et al. ................. 345/348 |
| 5,903,309 | A | * | 5/1999 | Anderson .............. 348/333.05 |
| 5,953,008 | A | * | 9/1999 | Hagiuda ..................... 348/339 |
| 6,188,431 | B1 | * | 2/2001 | Oie ........................... 348/211 |
| 6,191,819 | B1 | * | 2/2001 | Nakano .................. 348/333.02 |
| 6,226,449 | B1 | * | 5/2001 | Inoue et al. ............. 348/231.5 |
| 6,249,316 | B1 | * | 6/2001 | Anderson .............. 348/333.05 |
| 6,335,722 | B1 | * | 1/2002 | Tani et al. ................... 345/173 |
| 6,380,972 | B1 | * | 4/2002 | Suga et al. ............. 348/333.02 |
| 2001/0006579 | A1 | * | 7/2001 | Inoue et al. ................. 348/220 |

FOREIGN PATENT DOCUMENTS

JP          07030802      *   1/1995     .......... H04N/5/232

* cited by examiner

Primary Examiner—Wendy R Garber
Assistant Examiner—John M Villecco
(74) Attorney, Agent, or Firm—Ostrolenk, Faber, Gerb & Soffen, LLP

(57) ABSTRACT

According to this invention, an electronic photographing device in which image information corresponding to one set of images photographed by panoramic photographing can be recorded on a recording medium includes: a rotation direction setting device for setting information corresponding to a rotating direction panoramic of the electronic photographing device in the panorama photographing; a rotating direction recording device for recording information corresponding to the rotation direction set by the rotation direction setting device on the recording medium; a control device for controlling an arrangement of the set of panoramic images on the basis of the information corresponding to the rotation direction recorded on the recording medium; a display device for displaying editing information for performing predetermined image editing to the panoramic images arranged by the control device; and a control device for performing a predetermined editing operation on the basis of the editing information displayed on the display device.

13 Claims, 22 Drawing Sheets

FIG.6

| FILE NAME | PANORAMA NUMBER | FRAME NUMBER | ROTATING DIRECTION | PHOTOGRAPHING DATE | PROJECT | IMAGE DATA |

ELECTRONIC PHOTOGRAPHING DEVICE FOR PANORAMIC PHOTOGRAPHING AND EDITING

BACKGROUND OF THE INVENTION

1. Field of the Invention

The present invention relates to an electronic photographing device capable of panorama photographing.

2. Related Art Statement

Conventionally, a photographing device capable of panorama photographing has been proposed. However, when the image data corresponding to a predetermined frame of a panoramic image photographed by the panorama photographing is erased, or when a protect code for inhibiting a write/read operation is recorded on the image data, an external, specially designed large-scale editing device is required.

When the image data corresponding to the panoramic image photographed in the panoramic mode is stored in an external memory device, the following cumbersome operation is required. That is, a recording medium for recording the image data must be temporarily unloaded from the camera and loaded on the external memory device to store the image data in the external memory device.

Additionally, a printer cannot be directly operated by a camera used in panoramic photographing to read predetermined panorama image data recorded on the recording medium of the camera to print the image.

SUMMARY OF THE INVENTION

The present invention provides a compact and inexpensive electronic photographing device which can be used in panoramic photographing, wherein predetermined image editing such as erasing can be easily performed to a panoramic image recorded on a recording medium of the camera.

The present invention also provides a compact and inexpensive electronic photographing device in which can be used in panoramic photographing, wherein image information stored in a recording medium of the camera can be easily stored in an external memory device.

The present invention additionally provides a compact and inexpensive electronic photographing device in which can be used in panoramic photographing, wherein an operation for causing a printer to print image information stored in a recording medium of the camera can be easily performed.

The present invention further provides a compact and inexpensive electronic photographing device in which can be used in panoramic photographing, wherein predetermined image editing such as erasing of a panoramic image recorded on a recording medium of the camera, downloading image information stored in the recording medium into an external memory device, or an operation for causing a printer to print the image information stored in the recording medium can be easily performed.

In short, according to the invention, an electronic photographing device in which image information corresponding to one set of images photographed by panoramic photographing can be recorded on a recording medium comprises:

a rotation direction setting device for setting information corresponding to a rotation direction of the electronic photographing device in the panorama photographing;

a rotation direction recording device for recording information corresponding to the rotation direction set by the rotation direction setting device on the recording medium;

a control device for controlling an arrangement of the one set of panorama images on the basis of the information corresponding to the rotation direction recorded on the recording medium;

a display device for displaying editing information for performing predetermined image editing to the panoramic images arranged by the control device; and a control device for performing a predetermined editing operation on the basis of the editing information displayed on the display device.

These advantages of the present invention will become further apparent from the following detailed explanation.

BRIEF DESCRIPTION OF THE DRAWING(S)

FIG. 6 is a recording format of the image information corresponding to a one-frame image recorded on the recording medium of the electronic photographing device according to the first and second preferred embodiments of the present invention.

DETAILED DESCRIPTION OF PREFERRED EMBODIMENTS OF THE INVENTION

Embodiments of the present invention will be described below with reference to the accompanying drawings.

A first preferred embodiment of the present invention will be described below.

The entire arrangement and operation of an electronic photographing device (to be referred to as a "camera" hereinafter) according to this embodiment will be described below.

Figure 1:
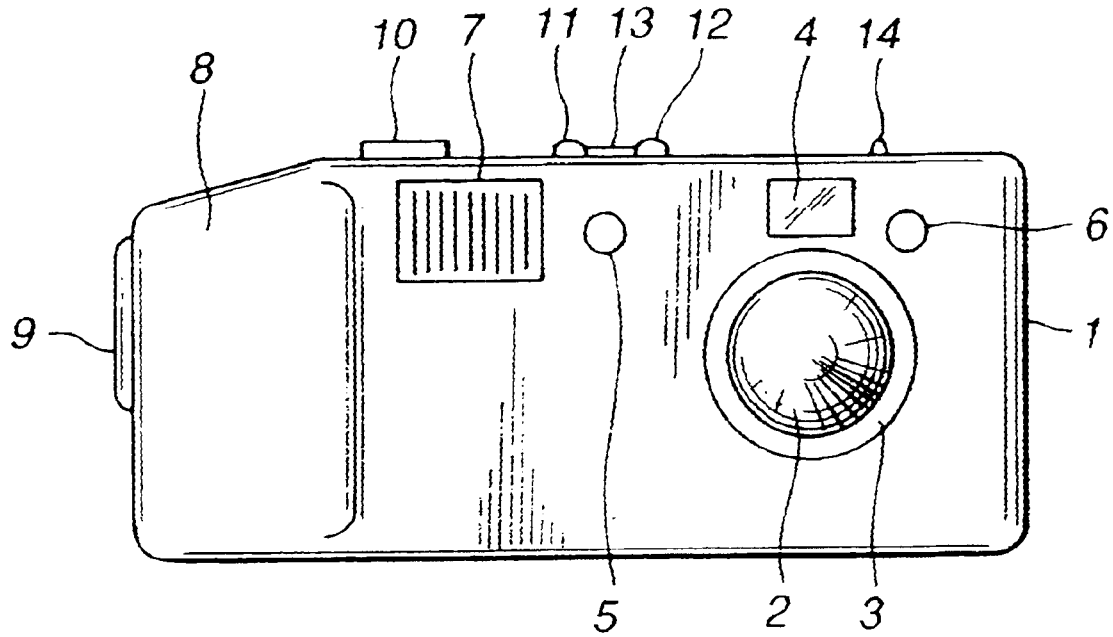
FIG. 1 is a front view showing the appearance of an electronic photographing device according to the first and second preferred embodiments of the present invention.
Figure 2:
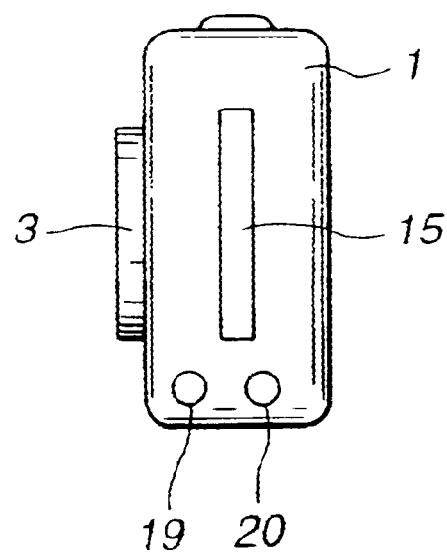
FIG. 2 is a side view showing the appearance of the electronic photographing device according to the first and second preferred embodiments of the present invention.
Figure 3:
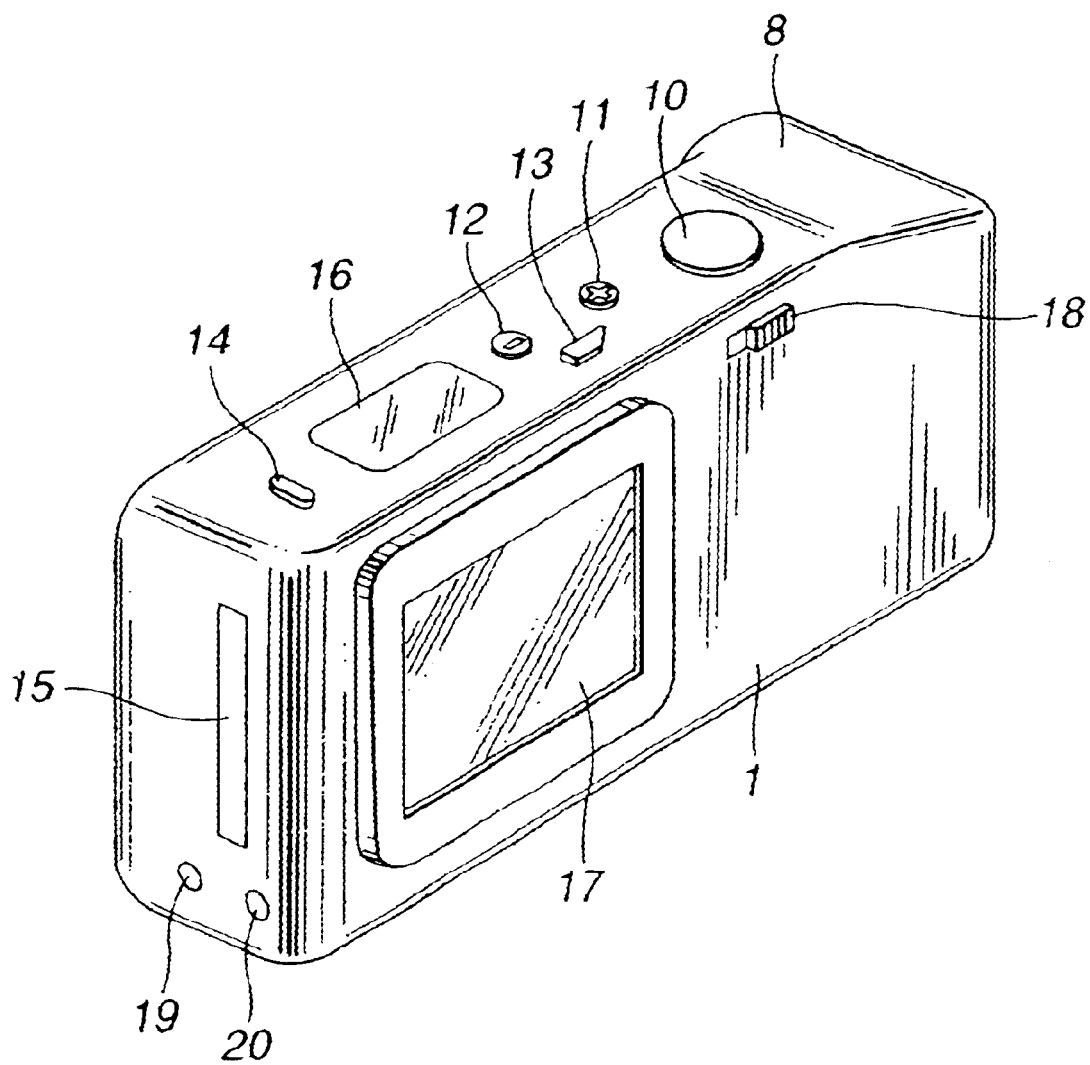
FIG. 3 is a perspective view showing the appearance of the electronic photographing device according to the first and second preferred embodiments when viewed from the rear surface side of the electronic photographing device.

FIGS. 1 to 3 are views showing the appearances of the camera, in which FIG. 1 is a front view, FIG. 2 is a side view, and FIG. 3 is a perspective view showing the camera when viewed from the rear surface.

Figure 4:
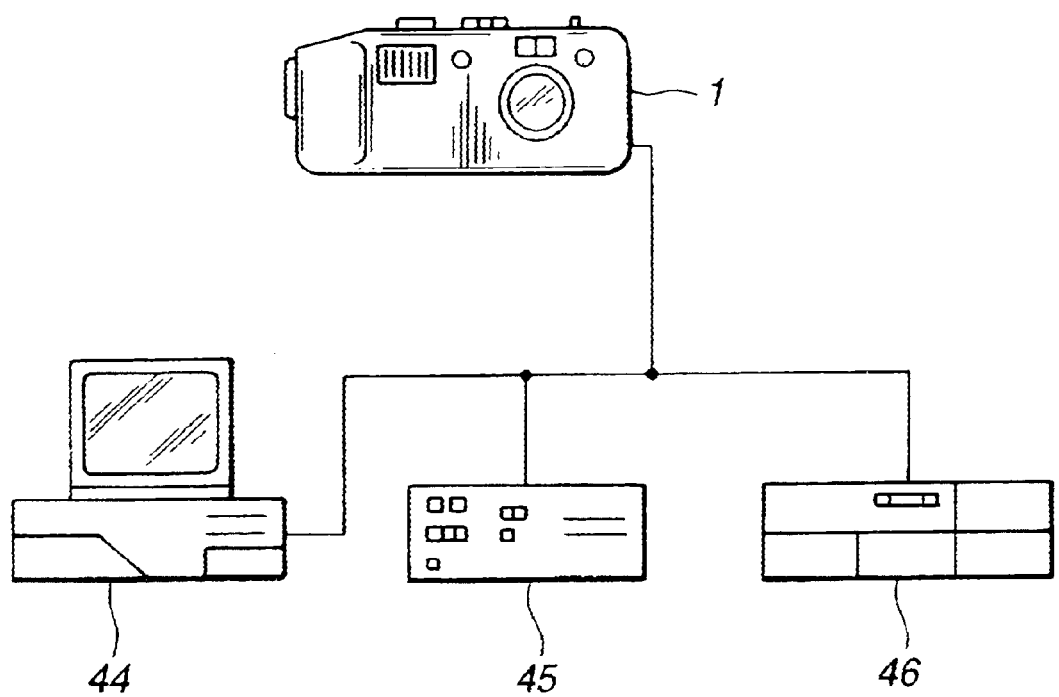
FIG. 4 is a view showing a state wherein the electronic photographing device according to the first and second preferred embodiments of the present invention is connected to a personal computer, a digital recorder, and a printer.

FIG. 4 is a view showing a state wherein the camera is connected to a personal computer (to be referred to as a "PC" hereinafter) 44, a digital recorder 45, and a printer 46.

Figure 5:
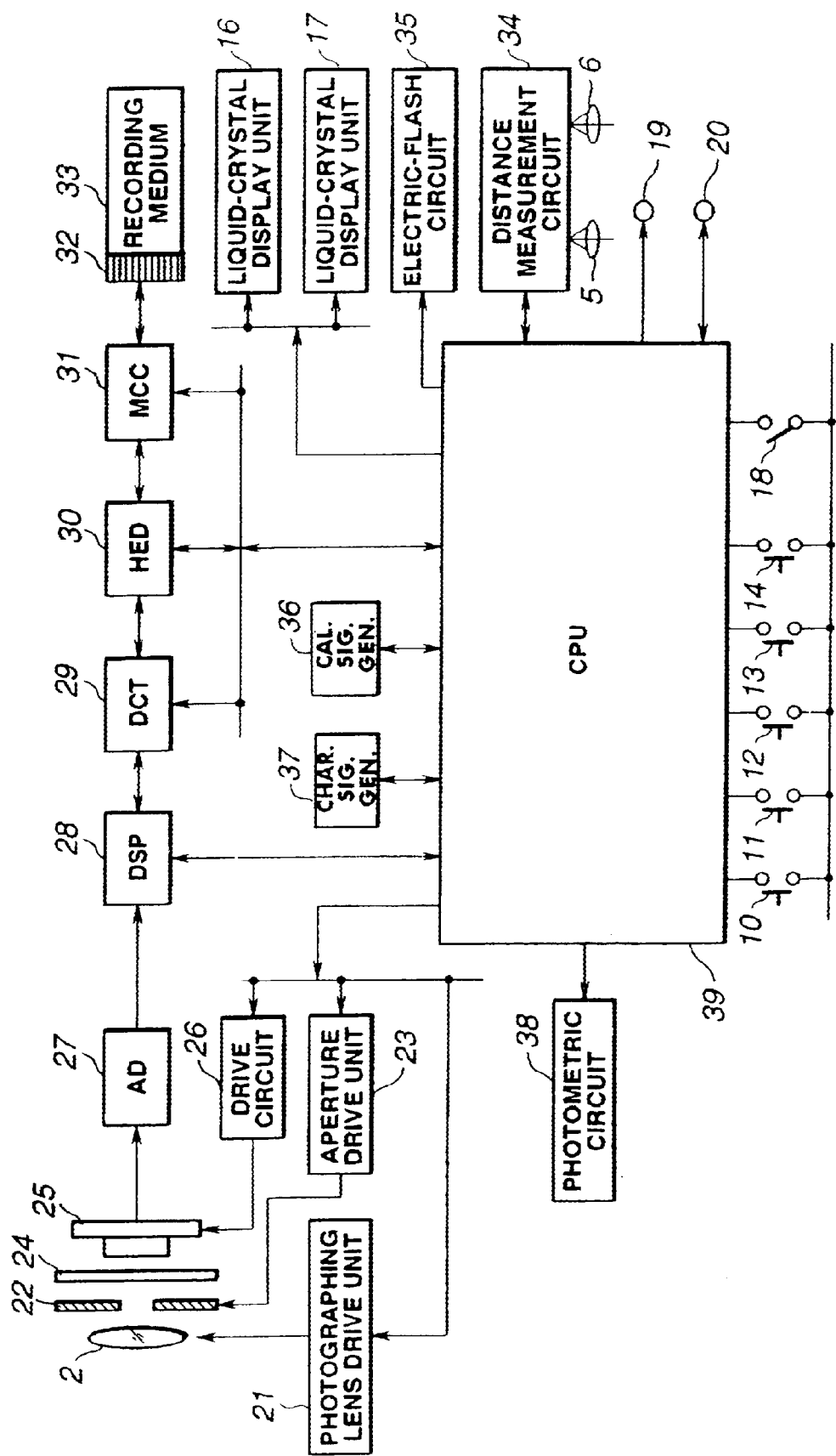
FIG. 5 is a block diagram showing an entire electric arrangement of the electronic photographing device according to the first preferred embodiment of the present invention.

FIG. 5 is a block diagram showing the entire electric arrangement of the camera.

As shown in FIG. 1, a photographing lens 2 held by a lens mirror cylinder 3 is arranged towards the right side of the central portion on the front surface of a camera body 1 as shown in FIG. 1. An optical finder objective unit 4 is exposed to the upper side of the photographing lens 2, and distance measurement lenses 5 and 6 are arranged on the left and right sides of the optical finder objective unit 4 to be spaced apart from each other by a predetermined base length. An electric-flash device 7 for illuminating an object is arranged on the left side of the distance measurement lens 5, and a grip portion 8 for holding the camera body 1 is arranged on the left side of the electric-flash device 7. A strap fixing portion 9 is arranged on the side surface of the grip portion 8.

On the side surface of the camera body 1 opposing the grip portion 8, as shown in FIG. 2, a recording medium insertion/extraction port 15 is provided for inserting/removing a recording medium 33 serving as a detachable recording means (to be described later). Below the recording medium insertion/extraction port 15, a video output terminal 19 for connecting the camera to a monitor television and a data input/output terminal 20 for connecting the camera to an external machine such as a printer or a PC are formed.

Referring to FIG. 3, arranged on the upper surface of the camera body 1 are a release switch 10; an increment switch 11 for updating a set numeral value such as a date to increase the value; a decrement switch 12 for updating a set numeral value or the like to decrease the value; a fixing switch 13 for fixing the data such as a date selected by the increment switch 11 or the decrement switch 12; a mode selection switch 14 for selecting a predetermined mode from various modes of the camera; and a liquid-crystal display unit 16 for displaying mode information or the like selected by the mode selection switch 14. These various operation switches are automatic-reset switches. Arranged on the rear surface of the camera body 1 is a liquid-crystal display unit 17 for displaying information which is required for a predetermined editing operation (to be described later) performed by the camera, such as a date selected by the increment switch 11 or the decrement switch 12 or a photographing date of an image. A power supply switch 18 for supplying a power to the camera is arranged on the upper right portion on the rear surface of the camera body 1.

Referring to FIG. 4, the camera body 1 is connected to the PC 44 to execute, as needed, further various types of image processing which cannot be executed by the camera itself. The camera 1 is connected to the digital recorder 45 to record a large amount of image data from that recorded on the recording medium 33 onto the digital recorder 45. The camera 1 is also connected to the printer 46 to cause the printer 46 to print the image corresponding to the image data recorded on the recording medium 33. The printer 46 is also connected to the PC 44 to enable the printing of the image corresponding to the image data processed by the PC 44.

The electric arrangement of the camera according to this embodiment will be described below with reference to FIG. 5. The same reference numerals as in the arrangements described in FIGS. 1 to 3 denote the same parts in the arrangement described in FIG. 5.

The photographing lens 2 is arranged to form an object image on the photographing surface of a solid state imaging element 25 arranged behind the photographing lens 2. The photographing lens 2 is mechanically connected to a photographing lens drive unit 21. The photographing lens 2 is driven to a predetermined position such that a clear object image is always formed on the photographing surface of the solid state imaging element 25 on the basis of a distance to an object measured by a distance measurement circuit 34 (to be described later).

An aperture 22 arranged behind the photographing lens has an aperture function of adjusting a depth of field and an amount of exposure for the solid state imaging element 25 and a shutter function of determining a shutter speed. This aperture 22 is mechanically connected to an aperture drive unit 23. The aperture 22 is set to have a predetermined diameter and a predetermined shutter speed on the basis of a command signal from a CPU (Center Processing Unit) 39.

An optical low-pass filter 24 for preventing reflected distortion from being generated in a video signal is arranged behind the aperture 22.

The solid state imaging element 25 is arranged behind the optical low-pass filter 24. A drive circuit 26 is connected to the solid state imaging element 25 to store a signal from the solid state imaging element for a predetermined period of time and generate a signal for reading the stored signal at a predetermined timing. The drive circuit 26 is connected to the CPU 39 to be controlled on the basis of a signal from the CPU 39.

The output terminal of the solid state imaging element 25 is connected to the input terminal of an A/D converter 27. An analog output signal from the solid state imaging element 25 is converted into a digital signal by the A/D converter 27, and the digital signal is sent to a Digital Signal Processor 28 connected to the output terminal of the A/D converter 27. The DSP 28 is a processor for dividing the digital signal into a color-difference signal and a luminance signal to perform correction and a compression/expansion process.

The output terminal of the digital signal processor 28 is connected to a Discrete Cosine Transform (to be referred to as DCT hereinafter) circuit 29. In the DCT circuit 29, an orthogonal transformation which is an image compression/expansion process in accordance with the JPEG is performed. The DCT circuit 29 is connected to a Huffman Encoder/Decoder 30. In this Huffman Encoder/Decoder 30, a predetermined process which is an image compression process in accordance with the JPEG is performed. With the Huffman encoding/decoding process performed here, a high-efficiency image compression/expansion process can be performed.

The output terminal of the Huffman encoder/decoder circuit 30 is connected to a Memory Control Circuit 31. The output terminal of this memory control circuit 31 is connected to the recording medium 33 through a connector 32. The memory control circuit 31 serves to record data on the recording medium 33 or read recorded data from the recording medium 33.

A distance measurement circuit 34 is a circuit for forming a signal for measuring a distance from the camera to an object. In this camera, the two distance measurement lenses 5 and 6 which are spaced apart from each other by a predetermined base length are arranged such that an object image is formed using the principle of triangular distance measurement on a light-receiving surface of a distance measurement sensor (not shown) serving as the main component of the distance measurement circuit 34.

The CPU 39 executes a predetermined process on the basis of an output signal from the distance measurement circuit 34 to calculate a distance to the object. On the basis of the calculation result, the CPU 39 sends a predetermined signal to the photographing lens drive unit 21. With this arrangement, the photographing lens drive unit 21 drives the photographing lens 2 to a predetermined position such that a focused object image is always formed on the photographing surface of the solid state imaging element 25.

The electric-flash circuit 35 is connected to the CPU 39. The CPU 39 is a circuit which radiates auxiliary light on the object when determined to be necessary by the CPU 39 on the basis of brightness information of the object measured by a photometric circuit 38 (to be described later), e.g., that the object has low brightness.

A calendar signal generation means 36 is connected to the CPU 39 to generate a calendar signal on the basis of a date input by a camera operator, a photographing date data recorded on the recording medium 33, or the present date generated by a timer incorporated in the CPU 39. This calendar signal may be incorporated in the CPU 39.

The character signal generation circuit 37 is connected to the CPU 39 to generate a character signal consisting of fonts such as letters and numbers which are required for display formats such as a calendar. The character signal may be incorporated in the CPU 39.

The liquid-crystal display units 16 and 17 are connected to the CPU 39 to be controlled by the CPU 39. The video output terminal 19 and the data input/output terminal 20 are also connected to the CPU 39, and all the various operation switches are also connected to the CPU 39. The basic functions of the various operation switches have been described above in FIGS. 1 to 3.

The photometric circuit 38 is connected to the CPU 39. The photometric circuit 38 is a circuit to measure the brightness of the object prior to a photographing operation. The value of a shutter speed is determined on the basis of information obtained by a photometric operation performed by the photometric circuit 38, which also determines whether auxiliary light is illuminated through the electric-flash circuit 35, as described above.

The CPU 39 is arranged to identify information input by an operator of the camera 1 and perform various controls of the entire camera depending on the identification information.

The operation of the first embodiment will be described below.

When the mode selection switch 14 arranged on the upper surface of the camera 1 is pressed, the mode is sequentially switched to various photographing modes or various process modes. This embodiment relates to a mode for performing panorama photographing (to be referred to as a "panorama mode" hereinafter) of these various modes.

This embodiment will be described below with reference to FIG. 6 showing a recording format of image information of each frame photographed and recorded on the recording medium 33, FIGS. 7 to 14 which are flow charts showing the flows of operations of this embodiment, and FIGS. 15 to 23 which are display examples of the liquid-crystal display unit 17 corresponding to the operations of this embodiment.

Figure 7:
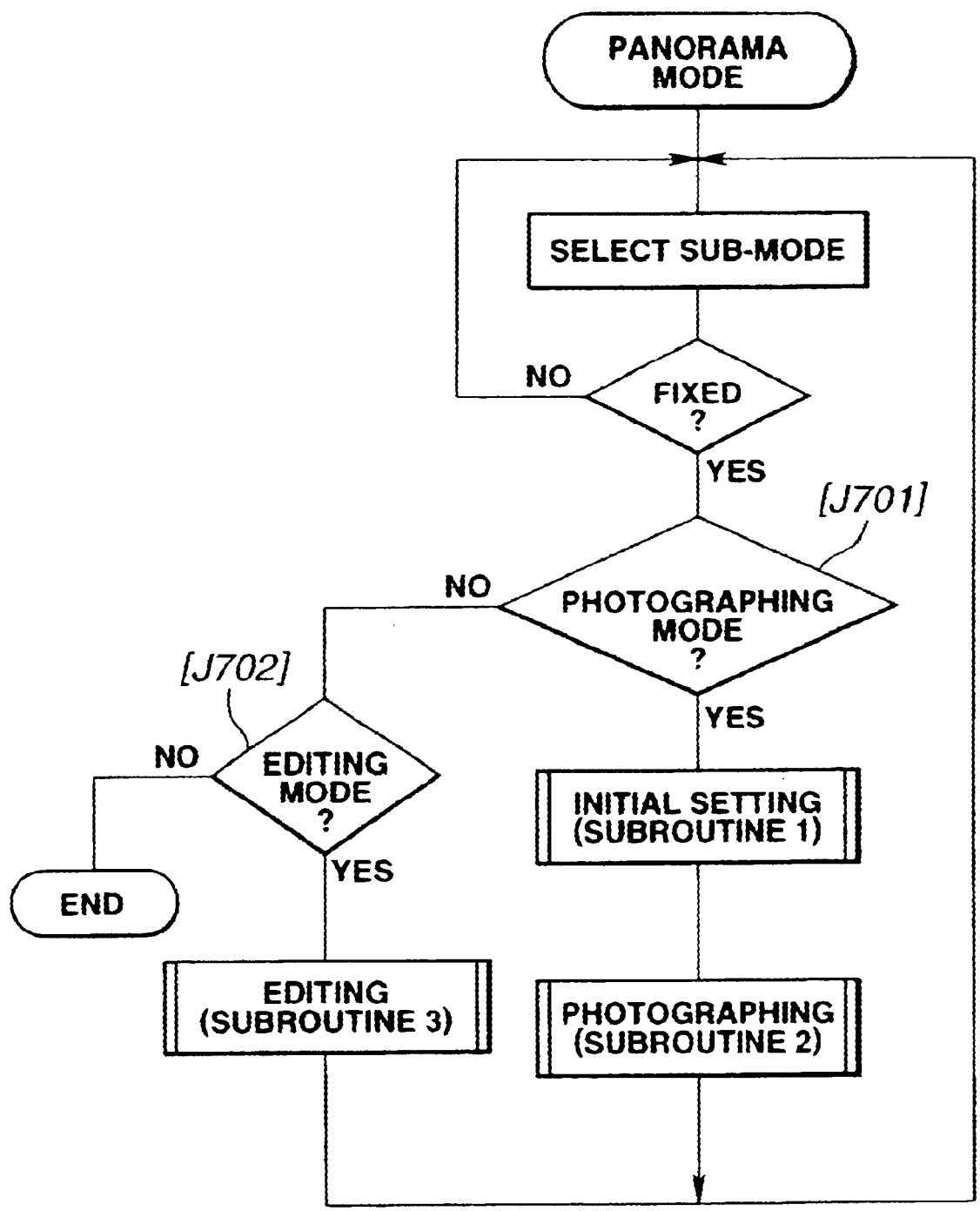
FIG. 7 is a flow chart showing the flow of the entire operation of the electronic photographing device according to the first preferred embodiment of the present invention.

FIG. 7 is a main routine showing the entire flow of the operation of this embodiment.

Figure 15:
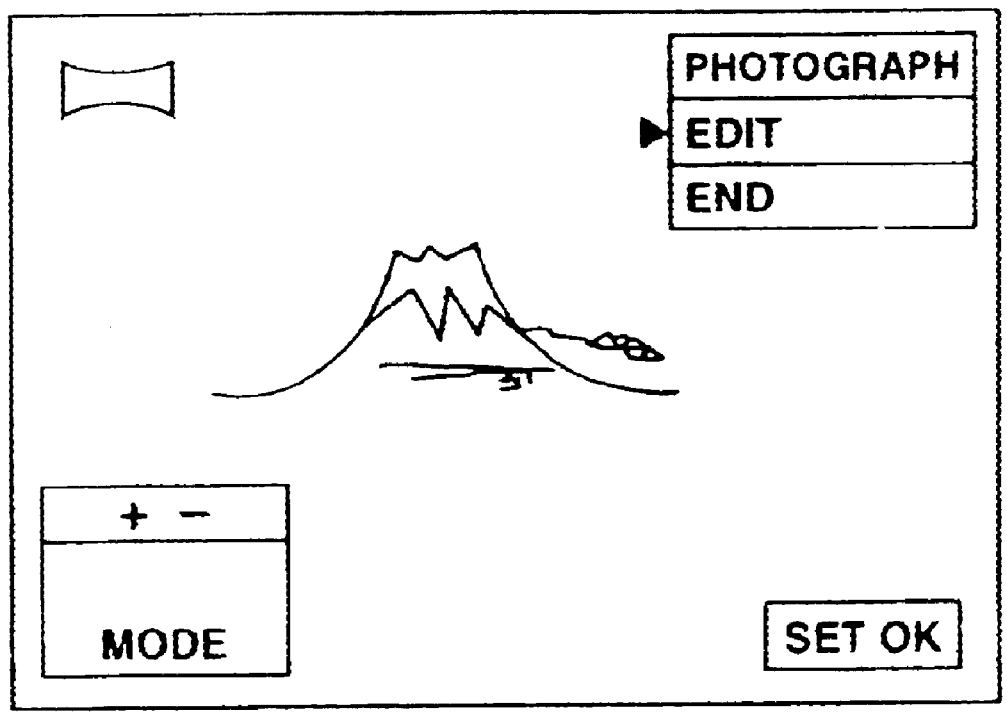
FIG. 15 is a view showing a display example of a liquid-crystal display unit when selection of the sub-mode of the panorama mode is performed in the electronic photographing device according to the first preferred embodiment of the present invention.

The mode selection switch 14 is pressed to select a panorama mode while checking the liquid-crystal display unit 16. When the panorama mode is set, as shown in FIG. 15, a menu constituted by a "photographing" mode, an "editing" mode, and "end" serving as sub-modes are displayed at the upper right portion of the liquid-crystal display unit 17. Operation contents operated by a camera operator are displayed at the lower left portion of the liquid-crystal display unit 17.

A display "+ −" represents that one sub-mode can be selected from the menu by operating the increment switch 11 or the decrement switch 12. The display at the upper left portion of the liquid-crystal display unit 17 is a display representing that the panorama mode is set.

When the increment switch 11 or the decrement switch 12 is operated, a triangle index on the left of the sub-modes moves. When the index moves to the position of a predetermined sub-mode, the fixing switch 13 is pressed, and the selection of the predetermined sub-mode is fixed. At the same time, a mark representing that the predetermined sub-mode has been selected and fixed is displayed at the lower right portion of the liquid-crystal display unit 17. It is checked whether the selected sub-mode is the "photographing" mode. In the following description, for descriptive convenience, this determination process is called [J701].

As a result of this determination process [J701], if it is determined that the "photographing mode" is set, various processes for panorama photographing (to be described later) are executed. On the other hand, as a result of the determination process [J701], if it is determined the editing mode is set, a predetermined editing process such as an erase process is executed to a panorama image photographed in the "photographing" mode.

As a result of the determination result [J701], if the "photographing" mode is selected, a subroutine (to be referred to as "subroutine 1") for determining an initial setting is executed. The subroutine 1 will be described below with reference to FIG. 8.

In the subroutine 1, a direction of a rotation angle of the camera in the panorama photographing is set.

Figure 16A:
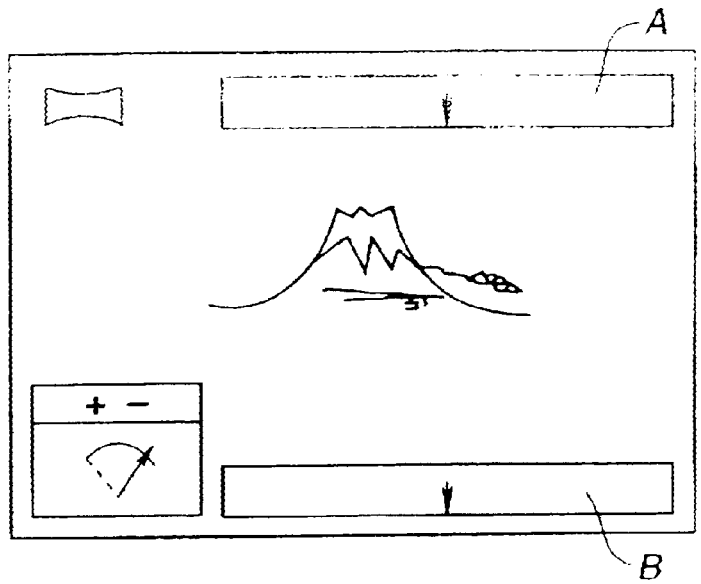
FIG. 16A is a view showing a display example of a liquid-crystal display unit when selection of a rotation direction of a camera in panorama photographing is performed in the electronic photographing device according to the first preferred embodiment of the present invention.

When the "photographing" mode is selected, a predetermined display as shown in FIG. 16A appears on the liquid-crystal display unit 17 to overlap the image of the object. Upper and lower rectangular marks and arrows in FIG. 16A represent that the camera is rotated such that the photographing surface of the solid state imaging element 25 corresponding to the position of the upper rectangular mark moves to the position where the object in the lower rectangular mark is photographed in the next photographing operation. More specifically, in this case, the camera is rotated from the upper side to the lower side.

Figure 16B:
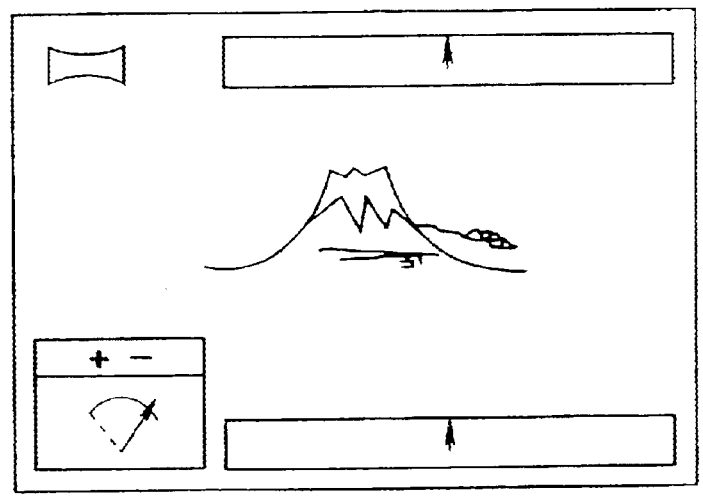
FIG. 16B is a view showing a display example of a liquid-crystal display unit when selection of a rotation direction of a camera in panorama photographing is performed in the electronic photographing device according to the first preferred embodiment of the present invention.

When the increment switch 11 is pressed, as shown in FIG. 16B, the direction of the arrows is switched. In this case, according to the same theory as described above, the camera is rotated from the lower side to the upper side.

Figure 17A:
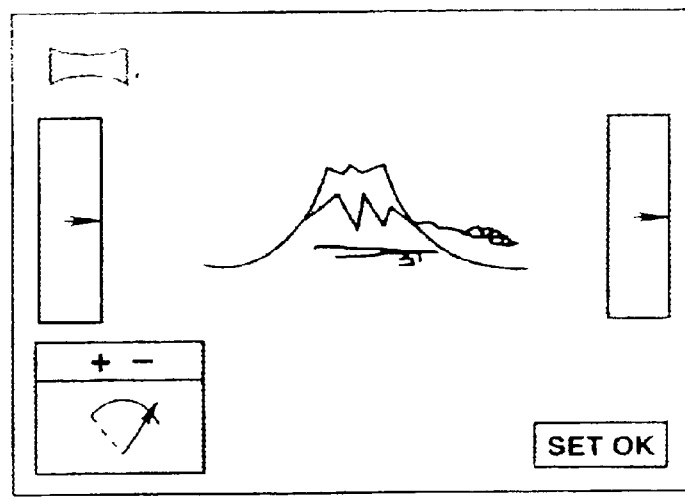
FIG. 17A is a view showing a display example of a liquid-crystal display unit when selection of a rotation direction of a camera in panorama photographing is performed in the electronic photographing device according to the first preferred embodiment of the present invention.

When the increment switch 11 is pressed, as shown in FIG. 17A, rectangular marks and arrows are displayed on the left and right sides of the liquid-crystal display unit 17. In this case, according to the same theory as described above, the camera is rotated clockwise.

Figure 17B:
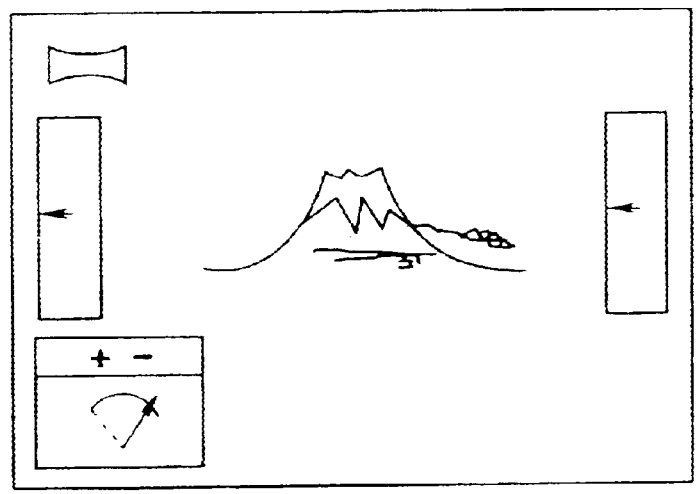
FIG. 17B is a view showing a display example of a liquid-crystal display unit when selection of a rotation direction of a camera in panorama photographing is performed in the electronic photographing device according to the first preferred embodiment of the present invention.

In addition, when the increment switch 11 is pressed, the direction of the arrows is switched as shown in FIG. 17B. In this case, according to the same theory as described above, the camera is rotated counterclockwise.

Although the display of the liquid-crystal display unit 17 is switched by pressing the increment switch 11 in the above description, the decrement switch 12 may be pressed. In this case, the display order is reversed.

When any one of the above displays representing the rotating directions of the camera appears on the liquid-crystal display unit 17 by pressing the increment switch 11 or the decrement switch 12, if the fixing switch 13 is pressed, the rotation direction of the camera is fixed.

As shown in FIG. 6, information representing the rotation direction of the camera is recorded on the recording medium 33 as header information in correspondence with each image.

Upon completion of setting of the rotation direction of the camera, the number of panorama-photographed frames of one set (the predicted number of panorama-photographed frames) is set. This setting will be described below with reference to subroutine 11 in FIG. 9.

In the subroutine 11, the number of available frames (n1) which can be recorded in the recording medium 33 is calculated. Selection is performed to check whether the predicted number of photographed frames (N) is equal to or larger than the predetermined number of frames.

Figure 18:
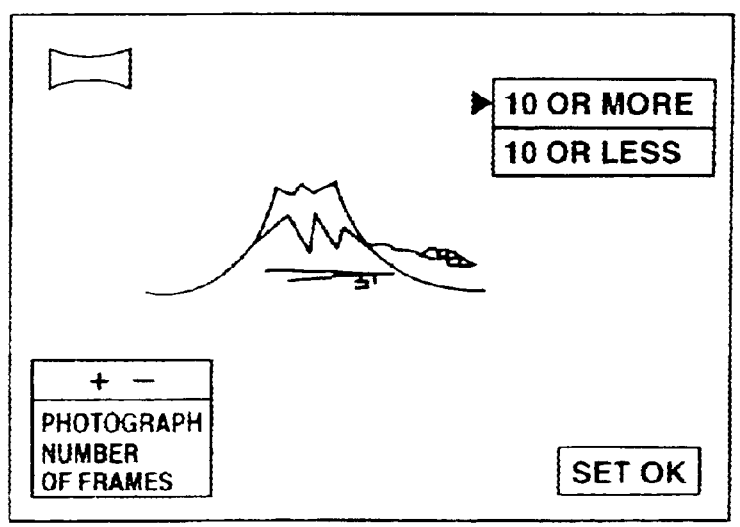
FIG. 18 is a view showing a display example of a liquid-crystal display unit when selection of the number of photographed frames in panorama photographing is performed in the electronic photographing device according to the first preferred embodiment of the present invention.

FIG. 18 shows an example in which two selection menus representing that the predicted number of frames N is equal to or larger than the number of panorama-photographingcapable frames n1 (temporarily set as 10) and that the predictive number of frames N is smaller than the number of unexposed frames n1 available for panoramic photographing are displayed on the upper right portion of the liquid-crystal display unit 17. As in the above operation, the triangle mark on the left side of the menus is moved by operating the increment switch 11 or the decrement switch 12.

The selected predictive number of frames to be panorama-photographed (N) is compared with the number of available frames (n1). Here, if N>n1 a warning (not shown) of "require spare recording medium" is displayed on the liquid-crystal display unit 17.

When the fixing switch 13 is pressed, a menu indicated by the triangle mark is fixed.

FIG. 18 is a view showing a case wherein 10 or more is selected as the predicted number of photographed frames. As described above, when a lack of capacity of the recording medium is predicted, the photographer is warned of the lack of capacity, so that the inconvenience of having the photographing unexpectedly stopped can be prevented.

As a result of the selection, it is checked whether N>n1 is satisfied. If N>n1 is satisfied, "1" is set in a flag ("FLG1" is set) serving as a predetermined memory in the CPU 39. On the other hand, in the above determination, if N>n1 is not satisfied, "0" is set in the FLG1. Here, FLG1=1 represents that a spare recording medium is required, and FLG1=0 represents no spare recording medium is required. Upon completion of the above flag, the control flow returns from the subroutine 11.

The number of photographed frames to be selected is not limited to the above example. Various numbers having smaller intervals may be selected as the number of photographed frames.

Figure 8:
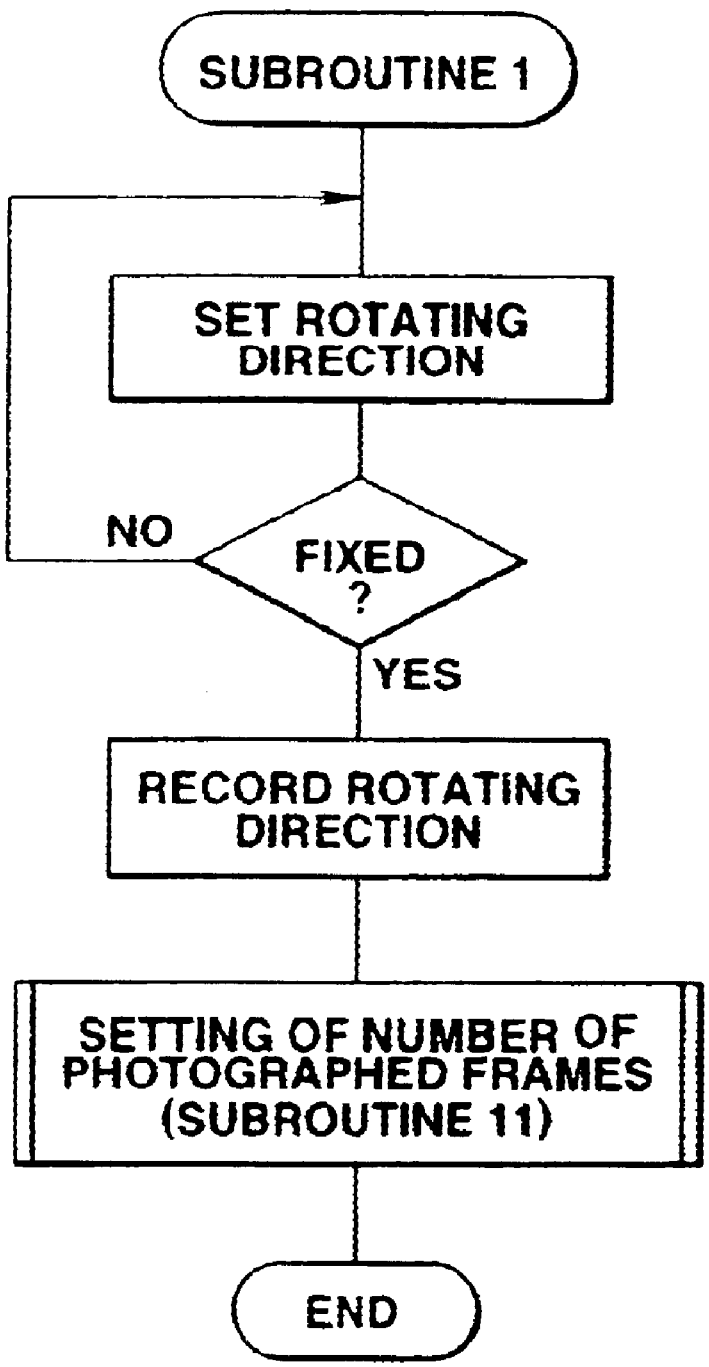
FIG. 8 is a flow chart showing an initial setting operation of photographing mode in the electronic photographing device according to the first preferred embodiment of the present invention.
Figure 9:
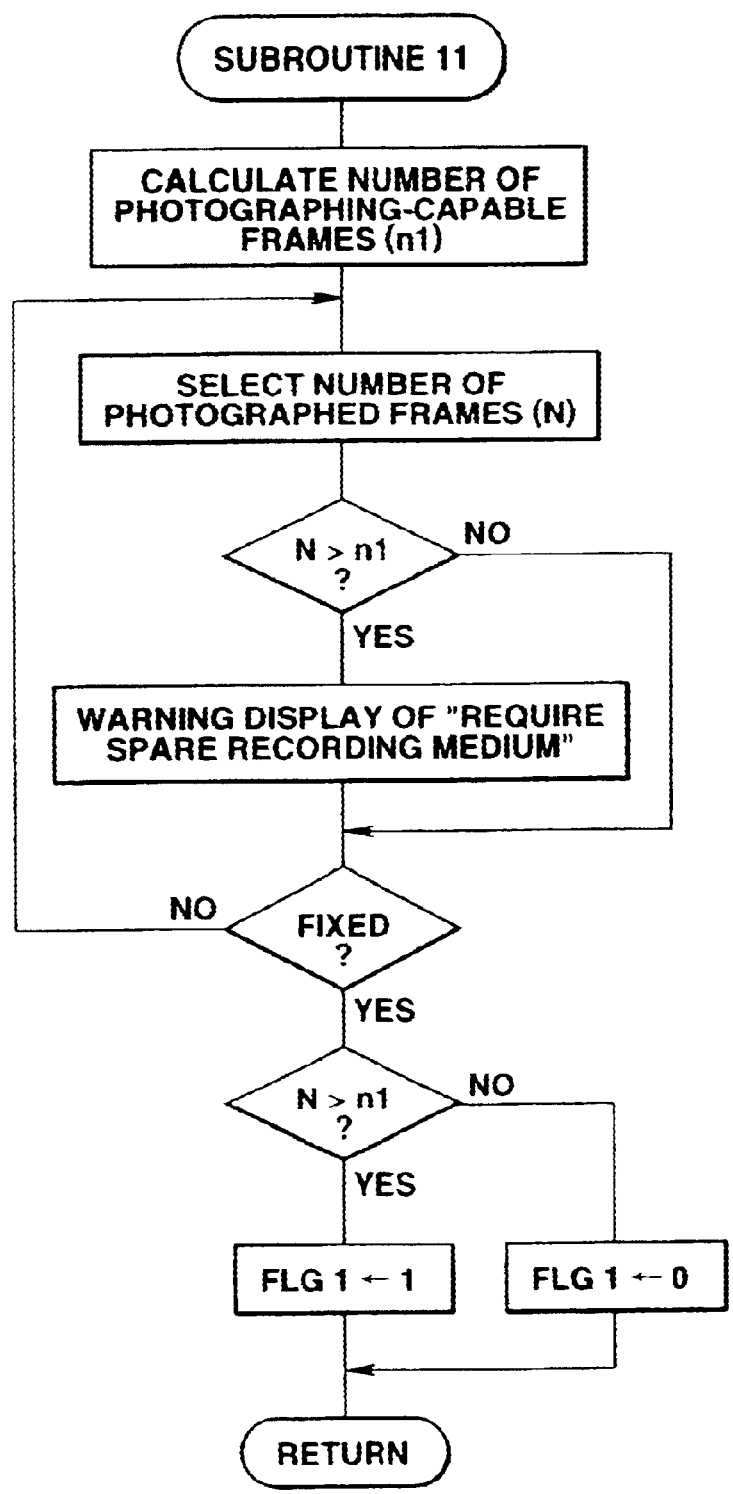
FIG. 9 is a flow chart showing an operation of setting the number of panorama-photographed frames of one set (the predictive number of panorama-photographed frames) in the electronic photographing device according to the first preferred embodiment of the present invention.

When the flow returns from the subroutine 11, the flow returns to the subroutine 1 shown in FIG. 8, and the flow returns from the subroutine 1. When the flow returns from the subroutine 1, returning to FIG. 7, the subroutine 2 representing the flow of photographing operation is executed.

The operations of the subroutine 2 will be described below with reference to FIG. 10.

It is checked whether the first frame is photographed in panoramic photographing mode. For convenience in the following description, this determination process is called [J1001]. As the determination result, if it is determined that the first frame is photographed, it is checked whether the release switch 10 is pressed.

Here, this determination process is called [J1002]. If the release switch 10 is not pressed, the determination process [J1001] is performed again, and the above operation is repeated. As a result of the determination process [J1001], if the first frame is not photographed, i.e., if the second frame or frame subsequent to the second frame is photographed, it is checked by the following manner whether the rotation angle of the camera falls within an allowable range.

When the camera is rotated in the direction designated in FIG. 16A, the image of a rectangular region "B" in the image of the first frame is ideally rotated to be located at a position "A" in photographing of the second frame. A correlation operation for detecting the degree of coincidence between both the images is performed between the image data of the region B in FIG. 16A recorded on the recording medium 33 after the releasing operation and the image data of the region A in FIG. 16A of image data which are photographed in real time at predetermined intervals of time and converted into digital signal before the next release operation. As a result of the correlation operation, if the degree coincidence falls within an allowable range, it is determined that the rotating angle of the camera is appropriate, and flickered "OK" is displayed on the liquid-crystal display unit 17 (not shown).

It is determined in the determination process [J1002] that the release switch 10 is pressed, it is checked again whether the first frame is panorama-photographed. This determination process is called [J1003]. If it is determined in the determination process that the first frame is panorama-photographed, distance measurement for measuring the distance from the camera to the object is performed to drive the photographing lens 2 to a predetermined position. A photometric operation for determining an aperture diameter and a shutter speed is performed. The photometric information is stored in an internal memory of the CPU 39. White balance information is also stored in the memory. Exposure is performed on the bases of the photometric information.

If it is determined in the determination process [J1003] that the first frame is not photographed, the distance measurement and the photometric operation are not performed, but exposure is performed under the same conditions as those in photographing of the first frame. This is because photographing of the second frame or a frame subsequent to the second frame is performed on the basis of the same distance measurement information, photometric information, and white balance information as those of the first frame. In this manner, the images of frames obtained by panorama photographing are synthesized with each other, a panorama image having an exposure, a focusing state, and white balance which are similar to those of a panorama image obtained by performing panorama photographing once can be obtained.

Upon completion of the exposure, an analog output signal from the solid state imaging element 25 is converted into a digital signal by the A/D converter 27. The digital signal is subjected to various signal processing such as image compression by the digital signal processor 28, the DCT circuit 29, and the Huffman encoder/decoder 30. The image data subjected to the predetermined signal processing is recorded on the recording medium 33 under the control of the memory control circuit 31.

As shown in FIG. 6, in correspondence with the image data of the respective frames, shared file names of frames constituting panorama images, panorama numbers serving as data added to panorama images in a photographing order, and frame numbers serving as data representing the photographing order of all images are recorded as header information. As the header information, in addition to the above information, a rotation direction which is described above and represents a rotation direction of the camera in panorama photographing, a photographing date, and a protect code (to be described later) are recorded.

Upon completion of photographing, the menus of the same sub-modes as shown in FIG. 15 are displayed at the upper right portion of the liquid-crystal display unit 17, and selection is performed to check whether panorama photographing continues. As in the above selection of a sub-mode, a predetermined sub-mode is selected from the menu by operating the increment switch 11 or the decrement switch 12, and the selected sub-mode is fixed by the fixing switch 13.

In this embodiment, as described above, the above selection for checking whether panorama photographing continues is performed for each frame photographed in panoramic mode. However, the invention is not limited to this embodiment. The following methods may be used. For example, an interrupt function is given to a predetermined switch during panoramic photographing, and the panorama photographing is ended when the predetermined switch is pressed. In addition, the number of panorama-photographed frames is input in advance, the panorama photographing may continue until photographing of the frames corresponding to the input number of panorama-photographed frames completed. In this manner, it is not necessary to check the selection whether panorama photographing continues after each time photographing of one frame is ended.

It is checked whether the fixed sub-mode is a "photographing" mode. Here, this determination process is called [J1004].

If the "photographing" mode is selected in the determination process, it is checked whether the number of remaining frames which can be recorded on the recording medium 33 is smaller than the predetermined number of frames (n2). This determination process is called [J1005]. As a result of the determination process, if the number of remaining recordable frames is not smaller than n2, the flow branches off to the determination process [J1001] to repeat the above operations.

If it is determined in the determination process [J1004] that "end" is selected, the flow returns from the subroutine 2 to end panoramic photographing.

If the "photographing" mode is selected in the determination process.[J1004], and if it is determined in the determination process [J1005] that the number of remaining frames which can be recorded on the recording medium 33 is smaller than n2, the determination results are displayed on the liquid-crystal display unit 17 with a warning (not shown). With this arrangement, a photographer can prepare for an exchange of recording media 33.

It is checked whether the number of remaining frames which can be recorded on the recording medium 33 is "0". This determination process is called [J1006]. If it is determined in the determination process that the number of remaining frames which can be recorded on the recording medium 33 is not "0", the flow branches off to the determination process [J1001] to repeat the operations described above.

If it is determined in the determination process [J1006] that the number of remaining frames which can be recorded on the recording medium 33 is "0", the determination result is displayed with a warning.

This warning display will be described below with reference to FIGS. 16C and 17C.

Figure 16C:
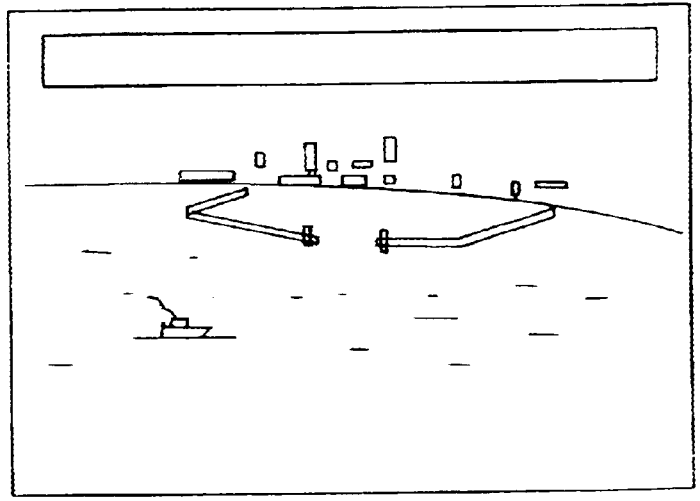
FIG. 16C is a view showing a display example of a liquid-crystal display unit when selection of a rotation direction of a camera in panorama photographing is performed in the electronic photographing device according to the first preferred embodiment of the present invention.

FIG. 16C shows a case wherein the rotation direction of the camera is set to be a direction in which the camera is rotated from the upper side to the lower side (FIG. 16A). FIG. 16 shows the following case. That is, when the capacity of the recording medium 33 becomes zero in the middle of panorama photographing of several frames, the rectangular mark and the arrow on the lower side of the screen are cleared and only the upper mark is displayed to warn a photographer that the capacity becomes zero. In this case, a panorama mark at the upper left portion of the screen, a mark "+−" at the lower left portion of the screen, and a mode display are cleared. This is because it is apparent that panorama photographing is performed, and such displays are not necessary.

Figure 17C:
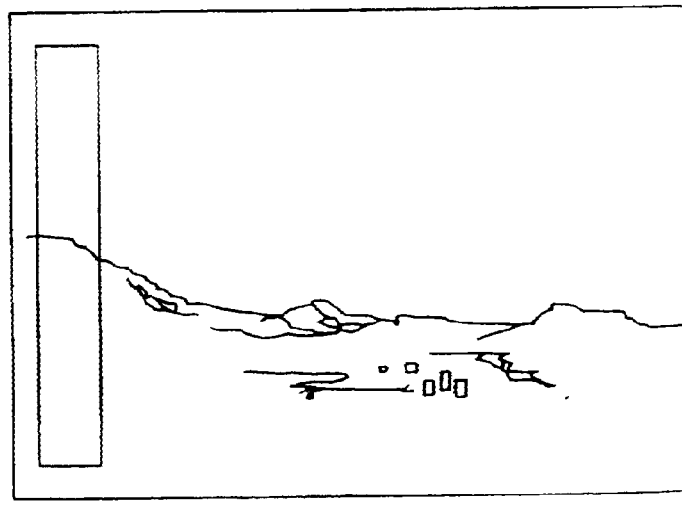
FIG. 17C is a view showing a display example of a liquid-crystal display unit when a camera is rotated in a selected direction in panorama photographing using the electronic photographing device according to the first preferred embodiment of the present invention.

FIG. 17C shows a case wherein the rotating direction of the camera is set to be to the right (FIG. 17A). FIG. 17C shows the following state. That is, when the capacity of the recording medium 33 becomes zero in the middle of panorama photographing of several frames, the rectangular mark and the arrow on the right side of the screen are cleared and only the left mark is displayed to display that the capacity becomes zero. In this case, for the same reason as described above, a panorama mark at the upper left portion of the screen, a mark "+−" at the lower left portion of the screen, and a mode display are cleared.

As described above, when one of the rectangular marks is cleared, it is apparent that the capacity of the recording medium 33 becomes zero, and a panorama photographing device which can be used in human engineering can be provided.

When the warning display is made, then it is checked whether the FLG1 is "0". This determination process is called [J1007]. Although the FLG1 is described in the explanation of the subroutine 11 shown in FIG. 9, FLG1=1 represents that the number of panorama-photographed frames is so large that a spare recording medium is required as the recording medium 33, and FLG1=0 represents that the spare recording medium is not necessary.

If FLG1=1 is satisfied in the determination process [J1007], a display representing that recording media must be exchanged is made on the liquid-crystal display unit 17 with the warning (not shown).

If FLG1=1 is not satisfied in the determination process [J1007], the flow returns from the subroutine 2 to end panorama photographing of one set of frames. More specifically, in this case, the determination process [J1007] serves as an inhibition means for inhibiting panorama photographing when the number of remaining frames which can be recorded on the recording medium 33 is determined as "0" in the determination process [J1006].

When the photographer does not want to continue panorama photographing, if the number of remaining frames which can be recorded on the recording medium 33 is determined as "0", the panorama photographing is forcibly inhibited, so that redundant operations such as mode switching can be omitted.

It is checked whether the recording media 33 has been exchanged. If it is determined that the recording media 33 has been exchanged, the flow goes to the determination process [J1001] again to repeat the above operations. Predetermined identification codes recorded on each recording media 33 are checked to determine whether recording media 33 has been exchanged. Here, when the recording media 33 is exchanged, the same file names used in the panorama photographing before the exchange, and the panoramic series numbers are added to the image data of the frames of the next panorama photographing session. In this manner, searching and editing operations for one set of panoramic images after photographing can be easily performed.

If FLG1=1 is not satisfied in the determination process [J1007], the flow returns from the subroutine 2. When the flow returns from the subroutine 2, the flow returns to the main routine in FIG. 7 to end the panorama mode.

The editing mode will now be described below.

If it is determined in the determination process [J701] in FIG. 7 that the "photographing" mode is not set, then it is checked whether the "editing" mode is set. This determination process is called [J702]. As a result of the determination process, if it is determined that the "editing" mode is set, the flow branches off to subroutine (subroutine 3) to perform editing.

The operation of the subroutine 3 will be described below with reference to FIGS. 11 to 14.

Figure 11:
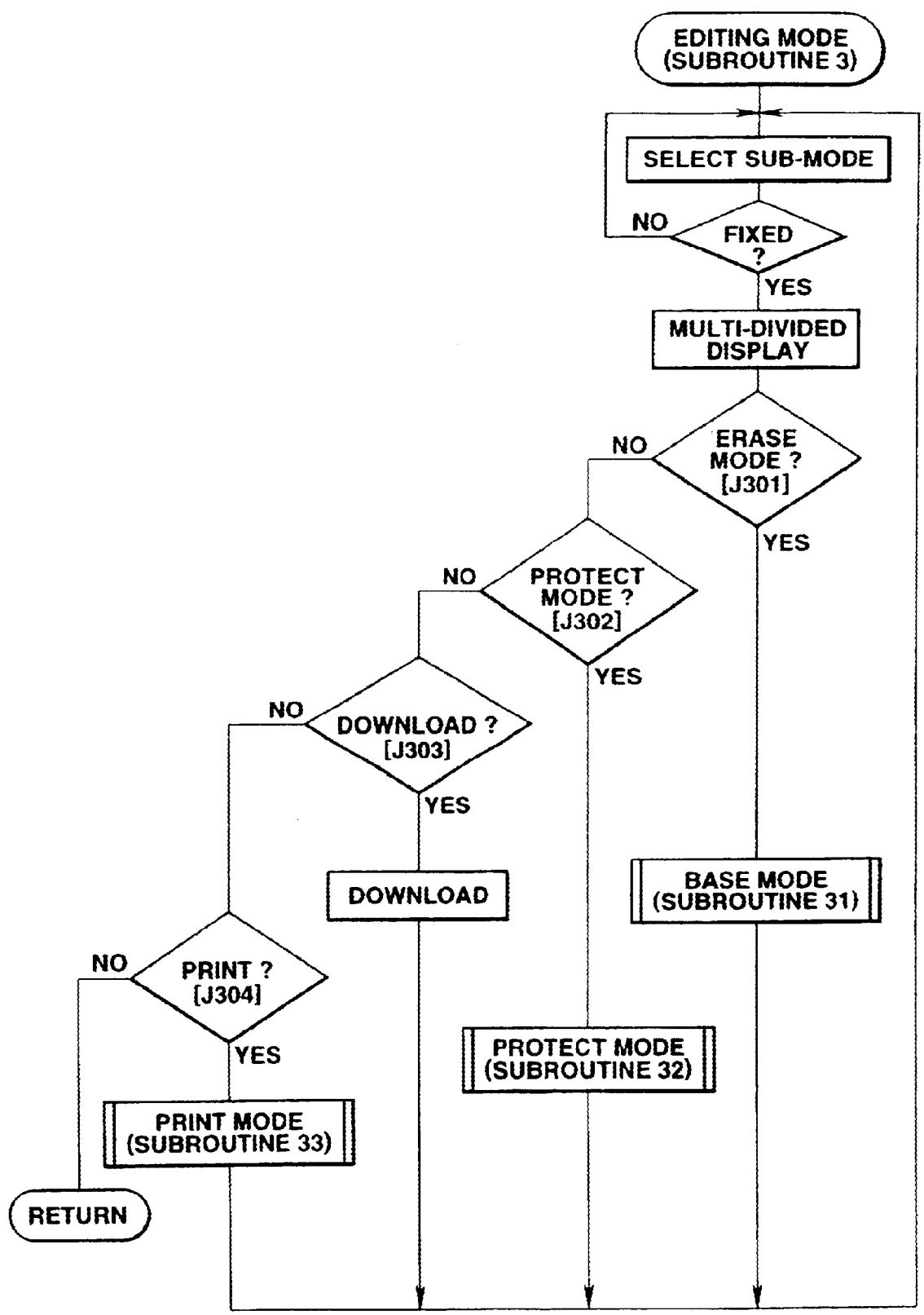
FIG. 11 is a flow chart showing the flow of the entire operation of an editing mode serving as a sub-mode of a panorama mode in the electronic photographing device according to the first preferred embodiment of the present invention.
Figure 19:
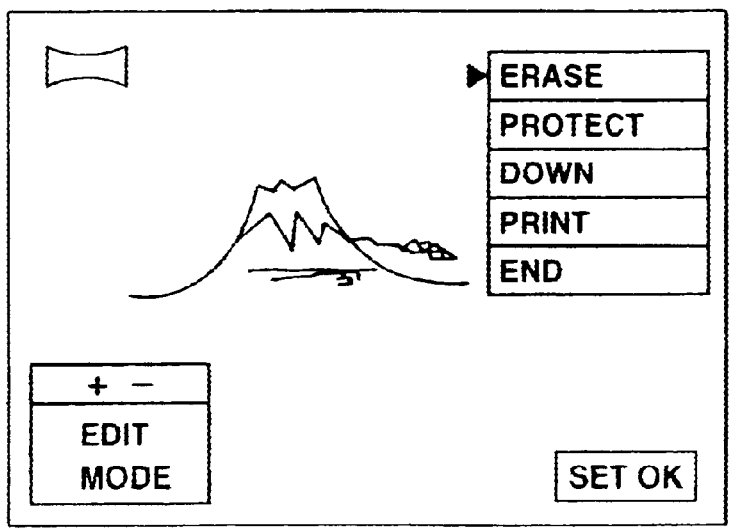
FIG. 19 is a view showing a display example of a liquid-crystal display unit when selection of the sub-mode of the editing mode is performed in the electronic photographing device according to the first preferred embodiment of the present invention.

In the subroutine 3 shown in FIG. 11, as shown in FIG. 19, menus "erase", "protect", "download", "print", and "end" which are sub-modes of the "editing" mode which are sequentially ordered from the upper side are displayed at the upper right portion of the liquid-crystal display unit 17. The "erase" is a mode for erasing stored image data.

The "protect" is a mode for inhibiting the stored image data from being erased or read. The "download" is a mode for storage image information from the recording medium 33 in an external memory device such as the digital recorder 45. The "print" is a mode for printing the image corresponding to the image data recorded on the recording medium 33. The "end" is a mode for ending an editing operation to cause the flow to return to the main routine.

As in the above sub-mode selection, the increment switch 11 or the decrement switch 12 is operated to select a predetermined sub-mode from the sub-modes. After the predetermined sub-mode is selected, when the fixing switch 13 is pressed, the sub-mode is fixed.

It is checked whether the fixed sub-mode is the "erase" mode. This determination process is called [J301]. As a result of the determination process, if the "erase" mode is set, subroutine (subroutine 31) in this mode is executed.

Figure 12:
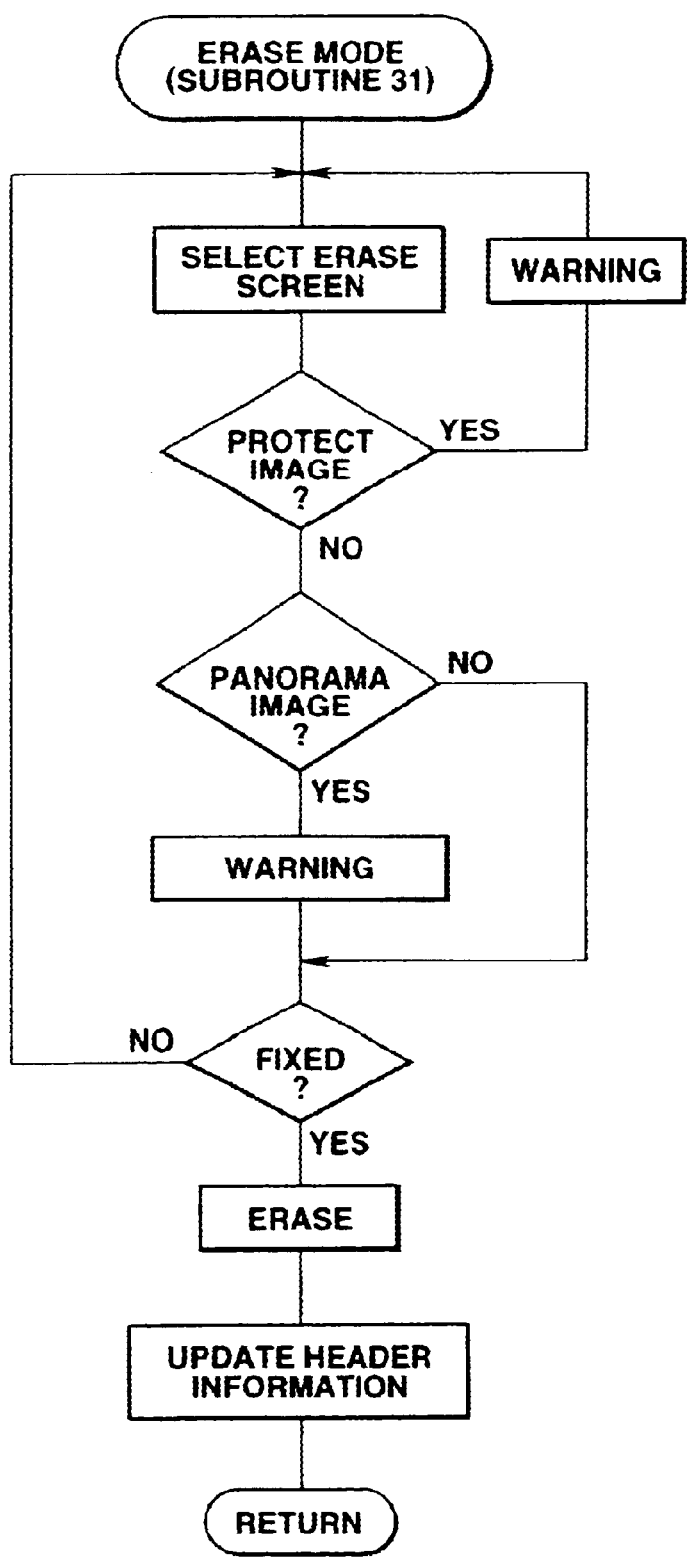
FIG. 12 is a flow chart showing the flow of the entire operation of an erase mode serving as a sub-mode of the editing mode in the electronic photographing device according to the first preferred embodiment of the present invention.

The operation of the subroutine 31 will be described below with reference to the flow chart in FIG. 12.

Figure 20A:
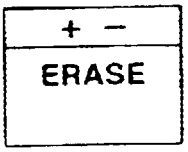
FIG. 20A is a view showing a display example in which a multi-divided photographed image is displayed on the liquid-crystal display unit in the erase mode serving as a sub-mode of the editing mode in the electronic photographing device according to the first preferred embodiment of the present invention.

When the "erase" mode is selected, as shown in FIG. 20A, the multi-divided image corresponding to image data recorded on the recording medium 33 is displayed on the liquid-crystal display unit 17. In FIG. 20A, the same letters denote one set of panorama images. The screen is divided into nine (3×3) small screens, and the small screens are sequentially displayed in a photographing order such that the three screens of the uppermost horizontal row of the entire screen are arranged from the left, and the three screens of the second horizontal row of the entire screen are arranged from the left. The arrangement of the small screens is called a screen sequential arrangement.

Selection of the erased screen is performed. On one of the multi-divided small screens, a circular point is flickered as shown in FIG. 20A. This flickered display represents the screen corresponding to image data to be erased. When the increment switch 11 is pressed, the flickered display moves horizontally in units of small screens. In a state wherein the flickered display is located in the small screen on the right end, when the increment switch 11 is pressed, the flickered display moves to the small screen on the left end of the next row. The same operations as described above are repeated. When the decrement switch 12, the flickered display moves in the direction opposite to the direction when the increment switch 11 is pressed.

Figure 20B:
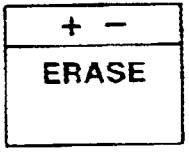
FIG. 20B is a view showing a display example in which a multi-divided photographed image is displayed on the liquid-crystal display unit in the erase mode serving as a sub-mode of the editing mode in the electronic photographing device according to the first preferred embodiment of the present invention.

The increment switch 11 is pressed, and, as shown in FIG. 20A, the flickered display is located in the small display on the right end of the lowermost row. In this case, when the increment switch 11 is pressed, as shown in FIG. 20B, the small screen shifts in the right direction. In this manner, even if all the images cannot be displayed on the screen at once, the entire image collection recorded on the recording medium can be easily confirmed.

When a protect code (see FIG. 6) is added to the image data corresponding to a small screen selected as described above, the protect code is displayed with a warning code representing an inhibition of erasing (not shown). In this case, if the small screen corresponding to protected image data is selected to be erased, the fixing switch 13 is invalid, and the image data is forcibly inhibited from being erased.

When the screen corresponding to image data to which a protect code is not added is selected, and the image corresponding to the fixed screen partially constitutes a panoramic image, a warning that the image partially constitutes a panoramic image is displayed (not shown). The checks as to whether the image partially constitutes a panoramic image is made by identifying the numbers (shown in FIG. 6) serving as data added to the panoramic images in their photographing order. The warning is given when the image is a frame partially constituting a panoramic image because the panoramic image has higher relativity to another frame than that of a single image.

When the fixing switch 13 is pressed, the image corresponding to the selected small screen is erased. If the fixing switch is not pressed, the operations following the selection on the erased screen are repeated.

When the fixing switch 13 is pressed to erase the image data corresponding to the selected small screen, if the erased image data partially constitutes a panoramic image, the header information added to the image data shown in FIG. 6 such as the file name, panorama number, and frame number of the separated panoramic image are updated.

When the number of frames constituting a panoramic image separated by erasing the image data is only one, the image is not panoramic image. The panorama number is updated to a code corresponding to an ordinarily photographed frame. In this manner, a panoramic image can be prevented from being erroneously recognized.

Upon completion of the above operation, the flow returns from the memory control circuit 31, and, in FIG. 11, returning to the selection of the sub-mode in the "editing" mode, the same operations as described above are repeated.

Figure 21A:
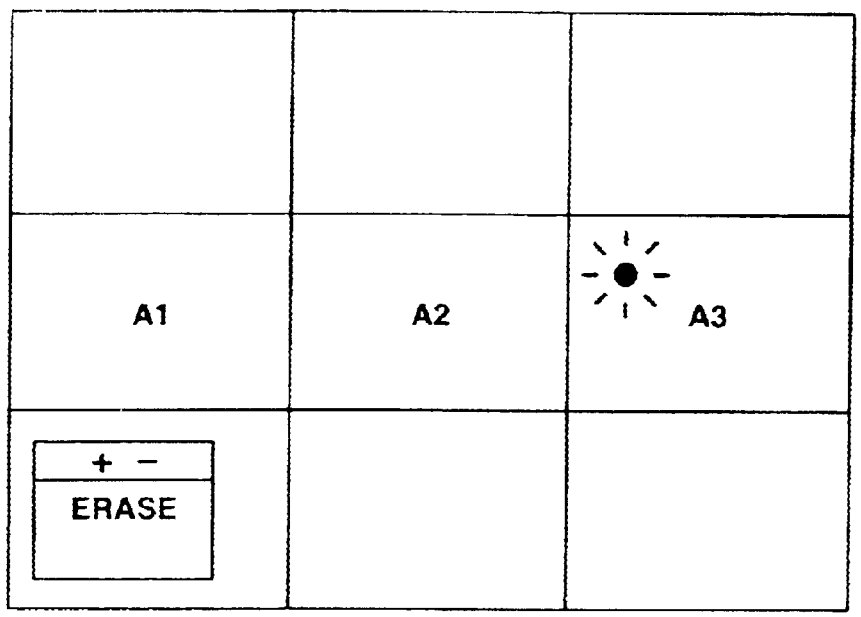
FIG. 21A is a view showing an example in which only a panoramic image is displayed at the central portion of the screen of the liquid-crystal display unit in the erase mode serving as a sub-mode of the editing mode in the electronic photographing device according to the first preferred embodiment of the present invention.

In the explanation of the "erase" mode, a display having a screen sequential arrangement is used as a multi-divided display. However, the display is not limited to the display having a screen sequential arrangement. More specifically, when the images corresponding to image data recorded on the recording medium 33 is a panoramic image, if the panoramic image is horizontally rotated to be photographed, the panoramic image is horizontally displayed at the center of the screen as shown in FIG. 21A. The direction and order of the arrangement of images constituting the panoramic image are determined on the basis of the panorama number and the rotation direction which are contained in the header information as shown in FIG. 6.

Figure 21B:
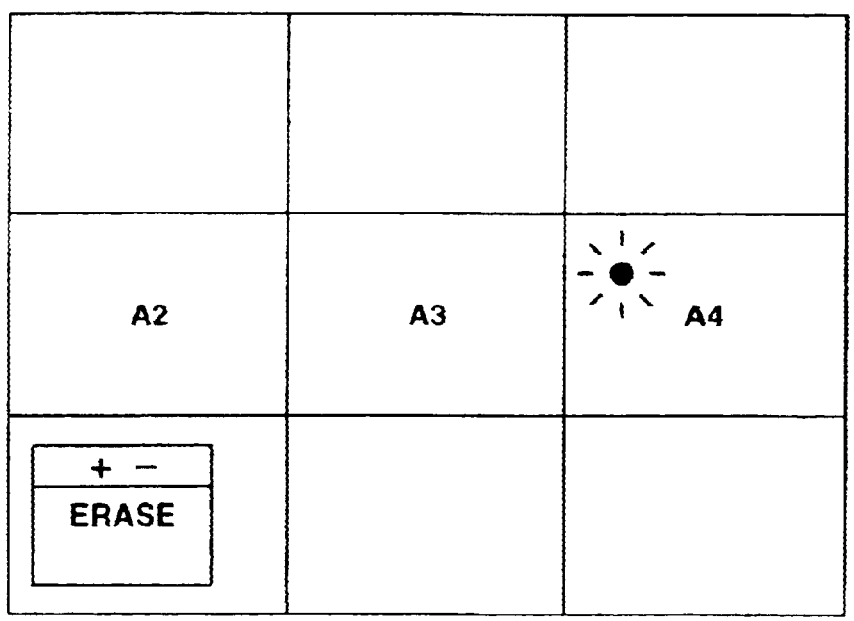
FIG. 21B is a view showing an example in which only a panoramic image is displayed at the central portion of the screen of the liquid-crystal display unit in the erase mode serving as a sub-mode of the editing mode in the electronic photographing device according to the first preferred embodiment of the present invention.

FIG. 21B shows a state in which the panoramic image is shifted to the right by one frame by pressing the increment switch 11. When the display is made as described above, the same image as an object actually photographed is displayed. For this reason, a checking operation and an editing operation for the photographed panoramic image can be easily performed advantageously.

In the above description, ordinarily photographed images are displayed at the same time with the panoramic image. The present invention is not limited to the above description, however. For example, only the panoramic image may be selectively displayed.

In the subroutine 3 representing the operations in the "editing" mode, if it is determined in the determination process [J301] that the "erase" mode is not set, then it is checked whether the "protect" mode is set. This determination process is called [J302]. As a result of the determination process, if the "protect" mode is set, subroutine (subroutine 32) in this mode is executed.

Figure 13:
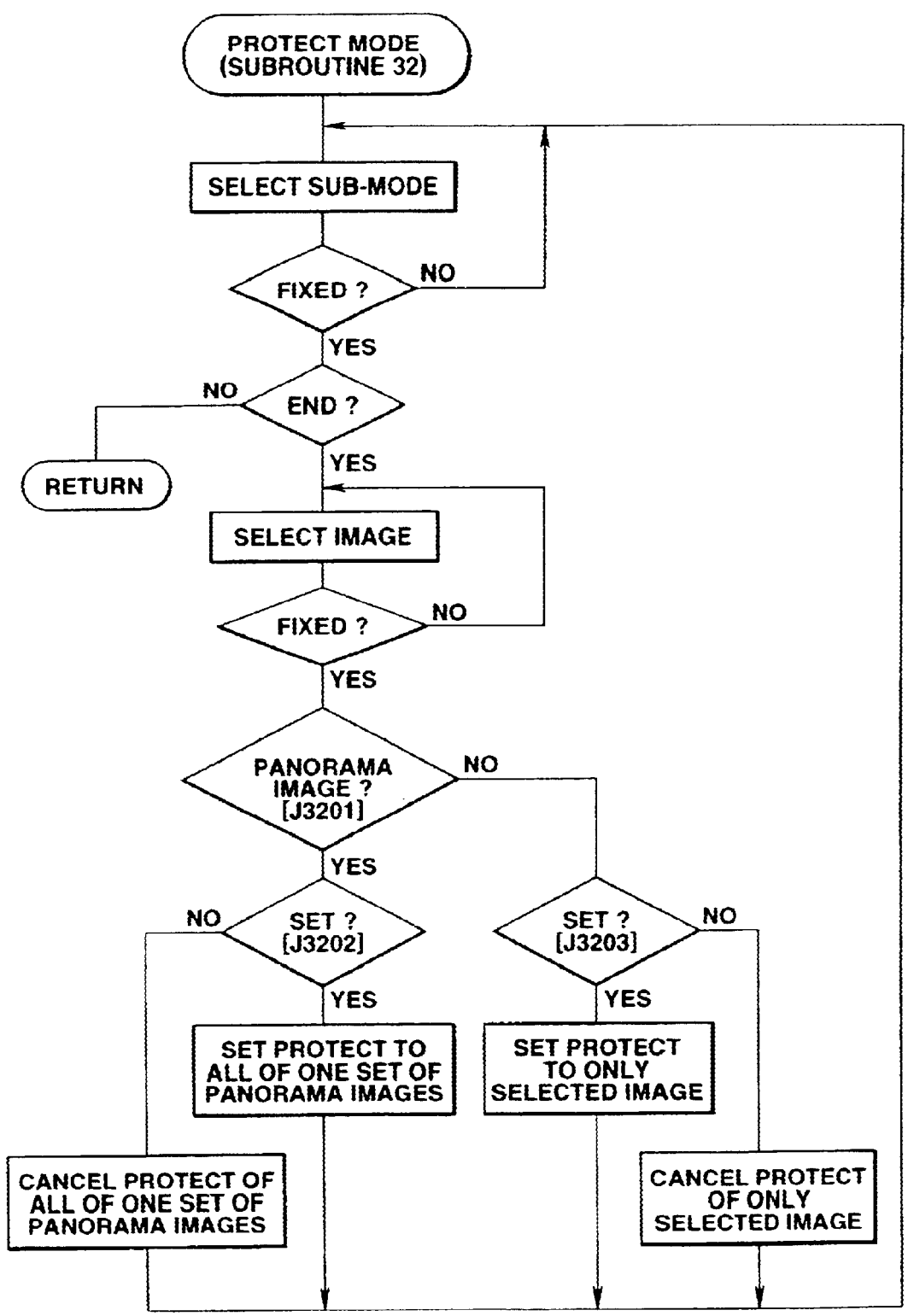
FIG. 13 is a flow chart showing the flow of the entire operation of a protect mode serving as a sub-mode of the editing mode in the electronic photographing device according to the first preferred embodiment of the present invention.
Figure 14:
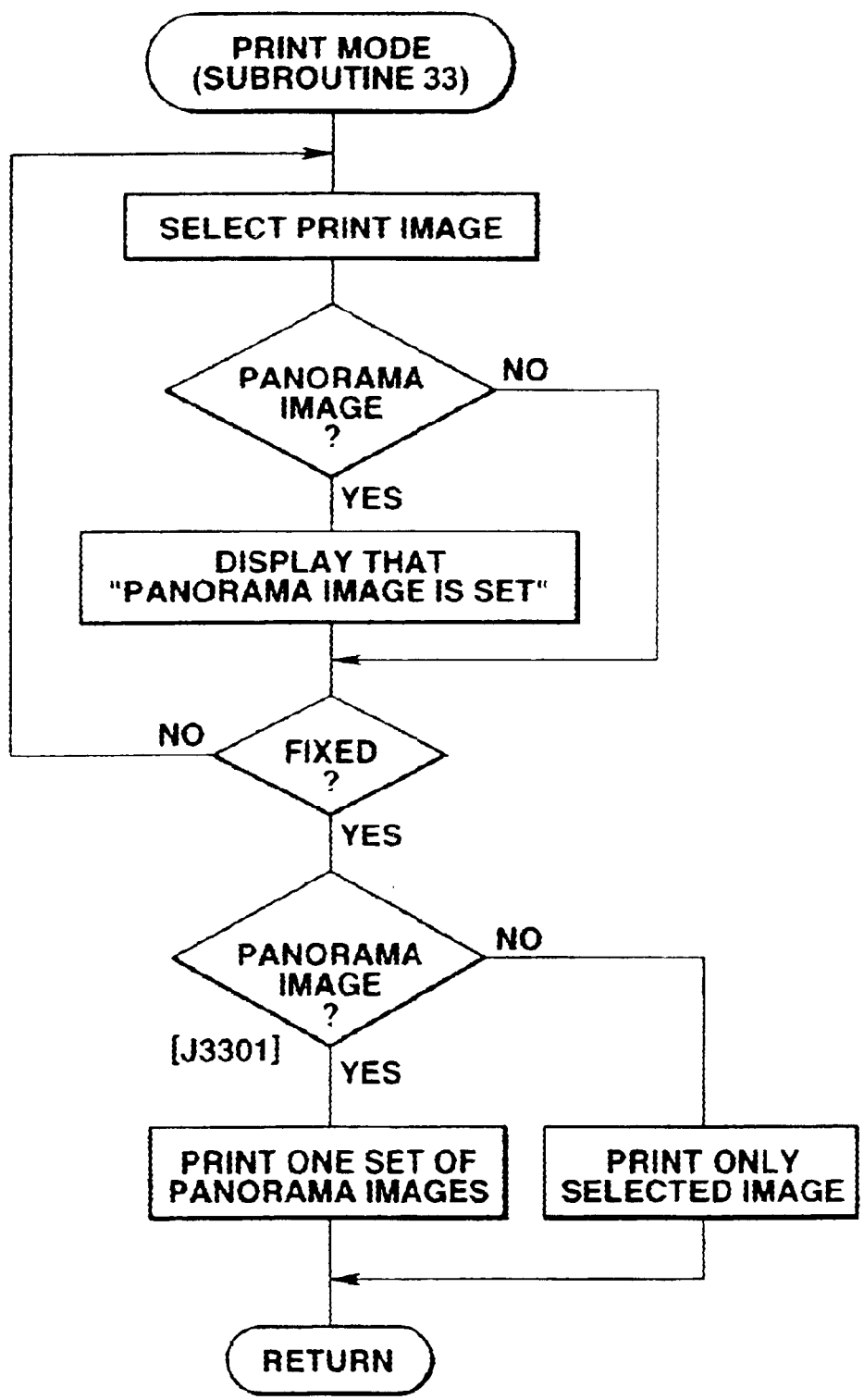
FIG. 14 is a flow chart showing the flow of the entire operation of a print mode serving as a sub-mode of the editing mode in the electronic photographing device according to the first preferred embodiment of the present invention.
Figure 22:
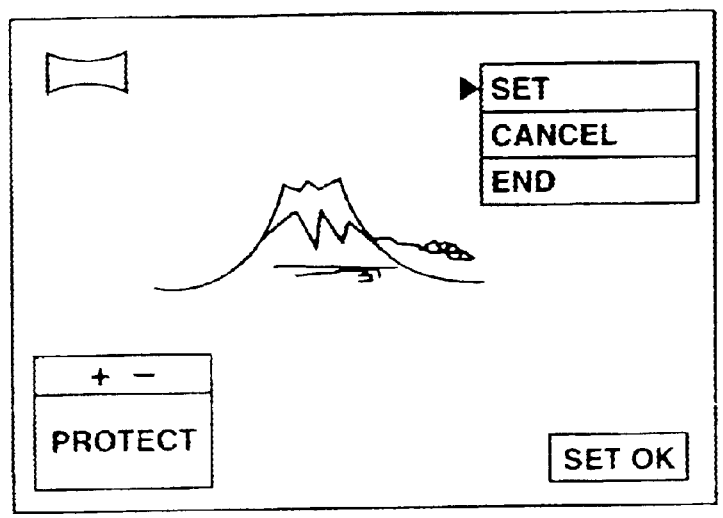
FIG. 22 is a view showing a display example of the liquid-crystal display unit when selection of a sub-mode of the protect mode serving as a sub-mode of the editing mode in the electronic photographing device according to the first preferred embodiment of the present invention.

This protect mode will be described below with reference to the flow chart shown in FIG. 13. In the subroutine 32 shown in FIG. 13, selection of a sub-mode is performed. The sub-modes are constituted by "setting" representing the setting of the protect mode, "cancel" representing the canceling of the protect mode, and "end" representing the end of the sub-mode selection of the protect mode. The selection of the sub-mode is performed in the same manner described above with respect to the explanations of other operations such that one of the menus displayed at the upper right portion of the liquid-crystal display unit 17 is selected as shown in FIG. 22.

In the selection of the sub-menu, if "setting" or "cancel" is selected, then setting of a protect code or selection of an image in which a protect code is to be canceled is performed. This image selection is performed by displaying the image photographed by the liquid-crystal display unit 17 in a multi-division state in the same manner as that of the selection of an erased screen. In this case, unlike the selecting operation of the erased screen, when an image subjected to setting or canceling of the protect code is be selected, it is checked whether a protect code has previously been added to the selected image or whether the selected image is included in one set of panorama images, but is not yet protected.

Upon completion of the selection of the image subject to the setting or canceling of the protect code, it is checked whether the selected image is an image included in a set of panoramic images. This determination process is called [J3201]. As a result of the determination process, if it is determined that the selected image is one image included in a set of panoramic images, then it is is checked whether the protect code is set. This determination process is called [J3202].

As a result of the determination process, if it is determined that setting of the protect code is performed, the protect codes are set to all of the images of the set of panoramic images as the header information of the image data as shown in FIG. 6.

As described above, protect codes are added to all of the panoramic image in the set when it is determined that the selected image is an image within a set of panoramic images because the panoramic images are usually processed as a whole. As a matter of course, the invention is not limited to the above description. For example, a protect code may be individually added to a single image included in a set of panoramic images.

As a result of the determination process [J3202], if it is determined that setting of the protect code is not performed, i.e., if it is determined that a cancellation of the protect code is to be performed, the protect codes of all of the panoramic images in the set are canceled. Upon completion of the above operation, the flow shifts to the selection of a sub-mode again to repeat the above operations.

If it is determined in the determination process [J3201] that the selected image is not an image is not an image belonging to a set of panoramic images, i.e., if it is determined that the selected image is an image photographed by ordinary photographing, then it is checked whether setting of a protect code is performed. This determination process is called [J3203]. As a result of the determination process, if it is determined that setting of a protect code is performed, a protect code is set for the selected image.

As a result of the determination process [J3203], if a setting of the protect code is not performed, i.e., if the protect code is canceled, the protect code of the selected image is canceled. Upon completion of the above operations, the flow shifts to the selection of a sub-mode again to repeat the above operations.

If "end" is selected in the selection of a sub-mode, the flow returns from the subroutine 32.

As shown in FIG. 11, if it is determined in the determination process [J302] that the "protect" mode is not set, then it is checked whether a "download" mode is set. This determination process is called [J303]. As a result of the determination process, if it is determined that the "download" mode is set, image information recorded on the recording medium 33 is stored in the digital recorder 45 serving as an external memory device. Upon completion of the above operations, the flow shifts to the selection of a sub-mode again to repeat the above operations.

If it is determined in the determination process [J303] that the "download" mode is not set, then it is checked whether a "print" mode is set. This determination process is called [J304]. As a result of the determination process, if it is determined that the "print" mode is set, subroutine (subroutine 33) in this mode is executed. The subroutine 33 will be described below with reference to FIG. 14.

When the flow branches off to the subroutine 33, a print image is selected. As in the "erase" mode, a photographed image is displayed in a multi-division state. As in the selection of an erased image in the "erase" mode, a print image to be printed is selected.

Figure 23:
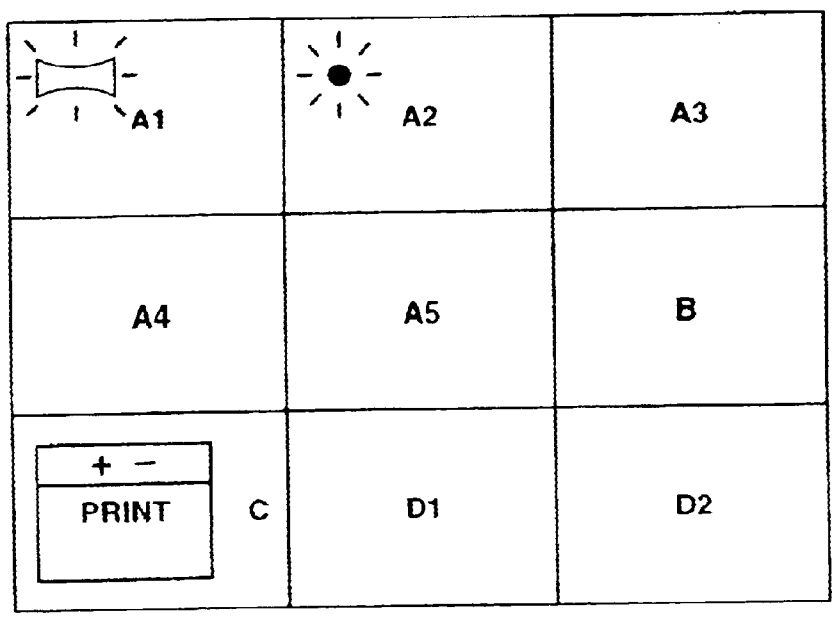
FIG. 23 is a view showing an example in which an image to be printed is selected by a circular flicker display in the print mode serving as a sub-mode of the editing mode in the electronic photographing device according to the first preferred embodiment of the present invention.

FIG. 23 shows a case wherein an image A2 serving as one frame from a set of panoramic images is selected. Here, if the selected image is the image of one frame of a panoramic image, a display appears indicating that the selected image is one frame of a panoramic image. In an example in FIG. 23, for this purpose, a panorama mark at the upper left of the screen is flickered.

It is checked whether the fixing switch 13 is pressed. If the fixing switch 13 is not pressed, the operation for selecting the print image is repeated. On the other hand, if the fixing switch 13 is pressed, then it is checked again whether the image is the image of one frame of the panorama image. This determination process is called [J3301]. Here, if the selected image is the image of one frame constituting the panoramic image, all of the panoramic images in the set to which the frame belongs are printed, and thereafter the flow returns from the subroutine 33.

As a result of the determination process [J3301], if it is determined that the selected image is not an image from a set of panoramic images, after the image of the selected frame is printed, the flow returns from the subroutine 33.

As described above, a predetermined image selected by the camera is printed on the basis of a command signal output from the camera. For this reason, the system can be reduced in size and cost.

As shown in FIG. 11, if it is determined in the determination process [J304] that the "print" mode is not set, it is understood that "end" is set, and the flow returns from the subroutine 3.

When the flow returns from the subroutine 3, in FIG. 7, the flow shifts to the selection of a sub-mode again to repeat the above operations.

In the determination process [J702], if it is determined that the "editing mode" is not set, it is understood that "end" is set, and all executions of the panorama mode are ended.

The second preferred embodiment of the present invention will be described below. In the following description, only arrangements and operations which are different from those of the first embodiment of the present invention will be explained.

In the first embodiment, when data corresponding to a rotation direction of the camera when panoramic photographing is performed is to be recorded on the recording medium 33 as header information for each photographed image, the rotation direction of the camera is manually selected. However, in the second embodiment, as a means for setting information corresponding to the rotation direction of the camera, a means for automatically setting the information on the basis of an output signal from an angular velocity sensor for detecting the rotation angle and rotation direction of the camera body 1 is used.

The appearances of a camera serving as an electronic photographing device according to the second embodiment are the same as those in FIGS. 1 to 3. A view showing a connection state between the camera and a PC 44 in the second embodiment is the same as that shown in FIG. 4.

Figure 24:
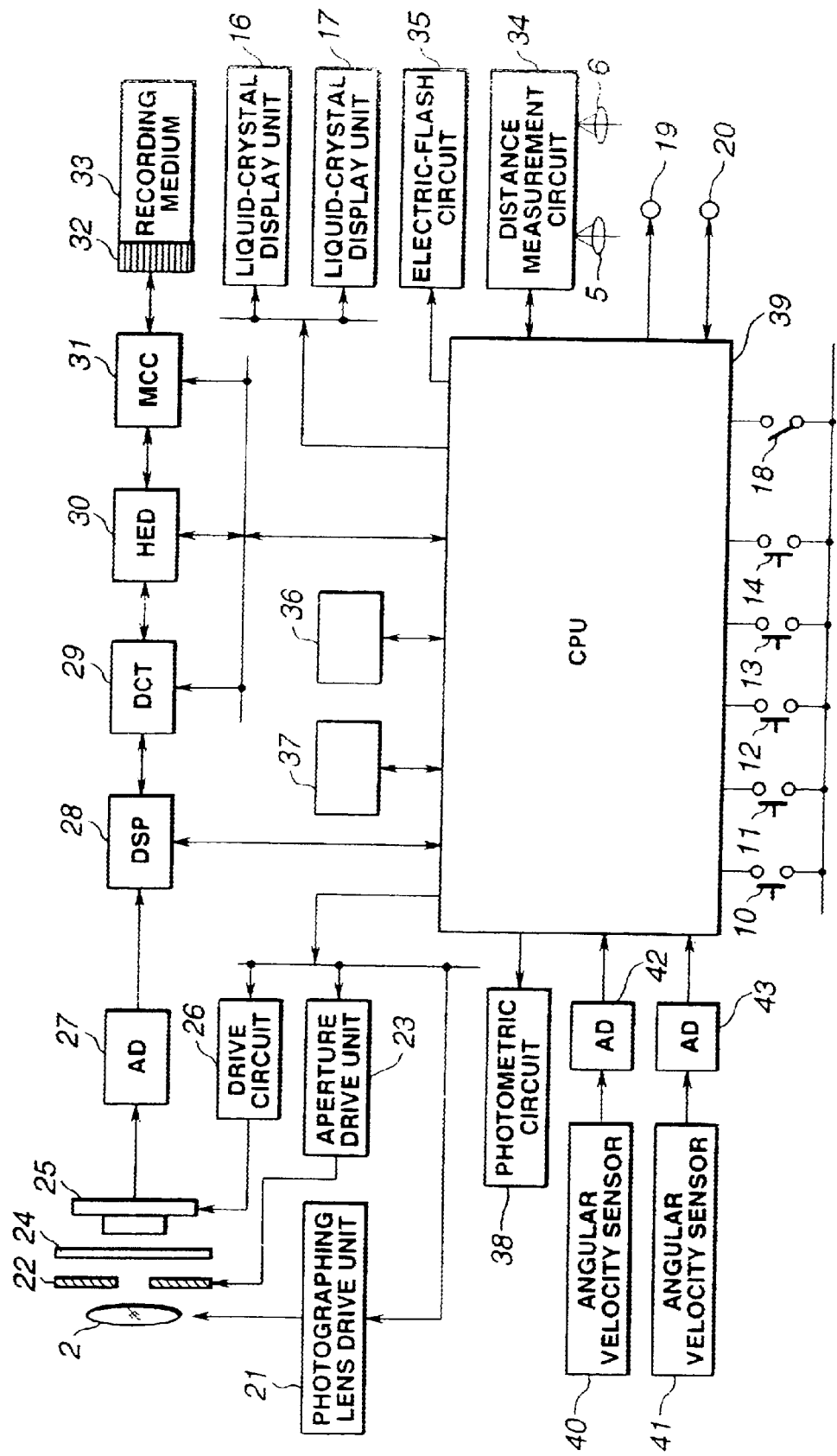
FIG. 24 is a block diagram showing an entire electric arrangement of the electronic photographing device according to the second preferred embodiment of the present invention.

FIG. 24 is a block diagram showing the entire electric arrangement of the camera according to the second embodiment. The arrangement and operation of the camera will be described below.

The output terminal of an angular velocity sensor 40 is connected to the input terminal of an A/D converter 42. The output terminal of the A/D converter 42 is connected to a CPU 39.

The angular velocity sensor 40 detects an angular velocity obtained when the camera is rotated about an y-axis which is a left-right direction when the camera is viewed from an object. An analog signal representing the angular velocity detected by the angular velocity sensor 40 is converted into a digital signal at a predetermined interval of time by the A/D converter 42, and the converted digital signal is subjected to time quadrature by the CPU 39. The digital signal subjected to time quadrature corresponds to an amount of rotation of the camera body 1 about the y axis. The rotation direction is determined by checking the polarity of the analog output signal from the angular velocity sensor 40.

The output terminal of the digital recorder 41 is connected to the input terminal of an A/D converter 43. The output terminal of the A/D converter 43 is connected to the CPU 39.

When the upper-lower direction of the camera is set to be an X-axis direction, the digital recorder 41 is to detect an angular velocity obtained when the camera is rotated about the X-axis. An analog signal representing the angular velocity detected by the angular velocity sensor 41 is converted into a digital signal at a predetermined interval of time by the A/D converter 43, and the converted digital signal is subjected to time quadrature by the CPU 39. The digital signal subjected to time quadrature corresponds to an amount of rotation of the camera body 1 about the X-axis. The rotation direction is determined by checking the polarity of the analog output signal from the angular velocity sensor 41.

The operation of the camera according to the second embodiment will be described below.

As described above, the second embodiment is different from the first embodiment only in the means for recording information related to the rotation direction of the camera in the "photographing" mode on the recording medium 33. Therefore, only the different portion will be explained below in a description of the operations of the second embodiment.

In the second embodiment, in the subroutine 1 shown in FIG. 8, an operation for manually setting a direction of the rotation angle of the camera is not required. In the subroutine 1, upon completion of execution of the subroutine 11 for setting the number of panorama-photographed frames, the subroutine 2 shown in FIG. 10 is executed.

Figure 10:
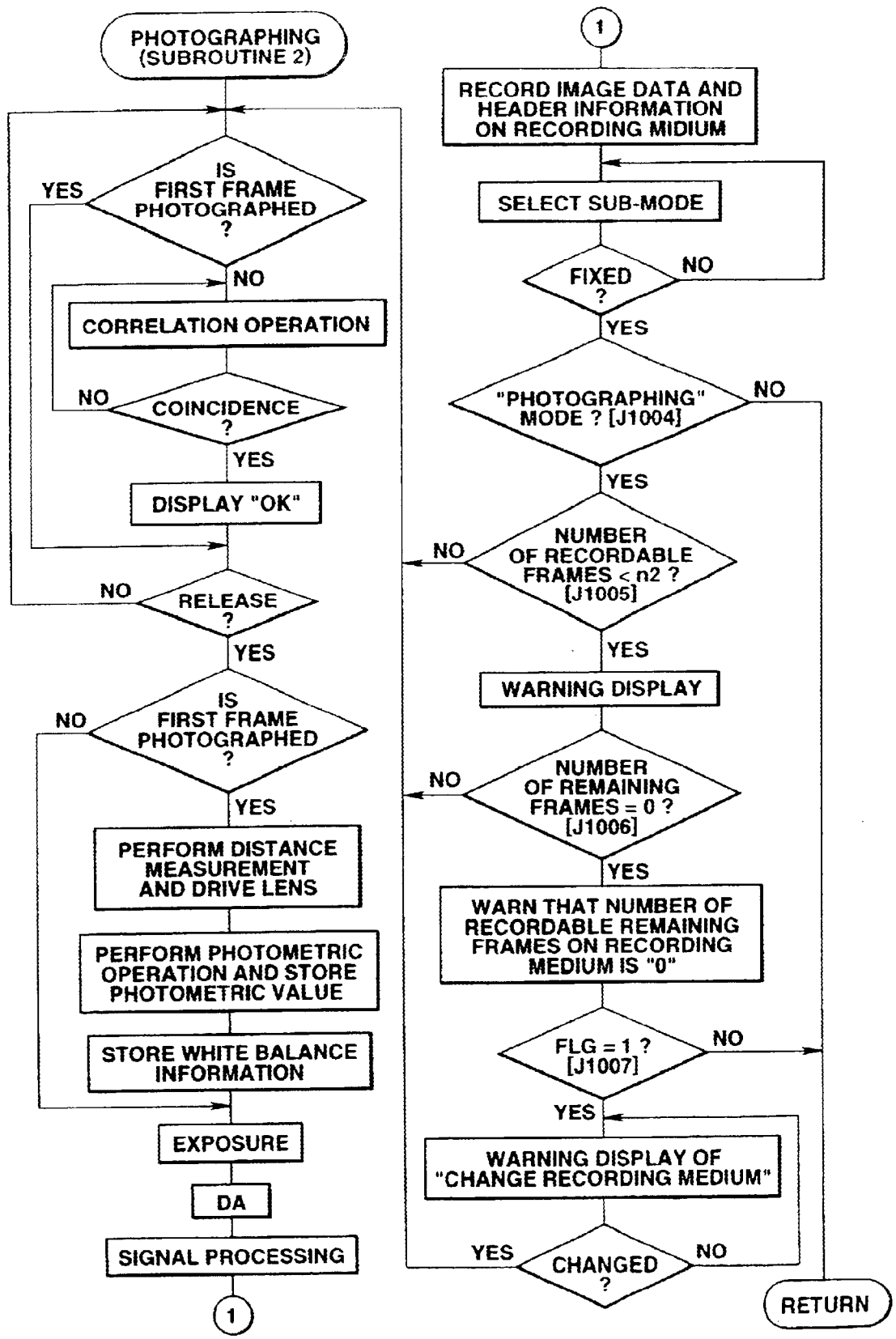
FIG. 10 is a flow chart showing the flow of photographing operations of the electronic photographing device according to the first preferred embodiment of the present invention.

In the subroutine 2 shown in FIG. 10, as in the first embodiment, it is checked whether the first frame is photographed in panorama mode. This determination process is called [J1001].

As a result of the determination process, it is checked whether the release switch 10 is pressed, the determination process is called [J1002].

If the release switch 10 is pressed, as in the first embodiment, predetermined photographing operations such as a photometric operation and an exposure operation are performed. However, in the second embodiment, in addition to the operations performed in the first embodiment, the time quadrature is executed on the converted output signals of the angular velocity sensors 40 and 41 immediately after the exposure operation. On the basis of the time quadrature, the rotation angle and rotation direction of the camera after photographing (exposure) of the first frame are calculated.

As a result of the determination process [J1001], if it is determined that the first frame has been photographed, i.e., if the second frame or a frame subsequent to the second frame is photographed, the rotation angle of the camera after the photographing (exposure) operation performed immediately before the photographing of the second frame or a frame subsequent to the second frame falls within an allowable range. More specifically, the rotation angle of the camera is calculated on the basis of the result obtained by performing time quadrature to the output signal from the angular velocity sensors 40 and 41, and of information such as a focal length of the photographing lens 2.

At the same time, the rotation direction is recorded as header information as shown in FIG. 6. While the camera is rotated, an arrow indicating the rotating direction of the camera is flickered and displayed at the lower right portion of a liquid-crystal display unit.

Figure 25:
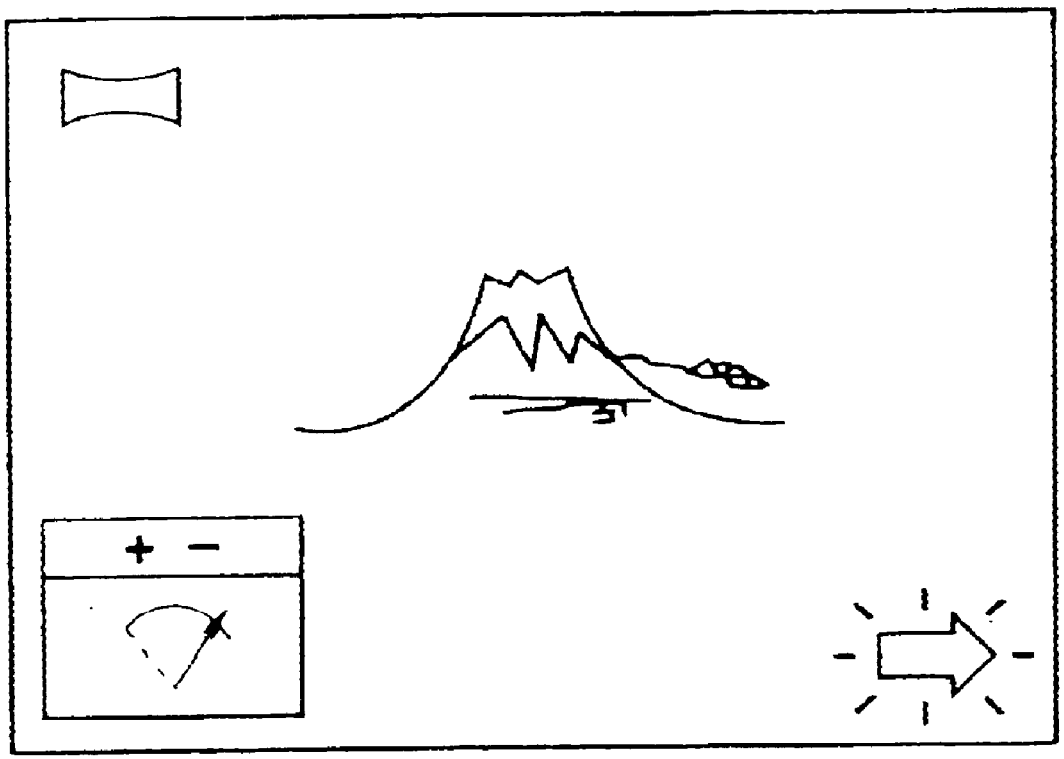
FIG. 25 is a view showing an example in which a rotation direction of a camera is displayed on the liquid-crystal display unit in panorama photographing of the electronic photographing device according to the second preferred embodiment of the present invention.

FIG. 25 shows an example wherein the camera is rotated clockwise. As a result of checking whether the rotation angle of the camera falls within an allowable range, if it is determined that the rotating angle of the camera falls within the allowable range, "OK" is flickered and displayed on the liquid-crystal display unit 17 (not shown). When this flickered display is confirmed, a release operation is performed again, and the next frame is panorama-photographed in the same manner as described above.

In the second embodiment, whether the rotation, angle of the camera falls within the allowable range is checked by directly calculating the rotation angle on the basis of the time quadrature of the output signals from the angular velocity sensors 40 and 41. However, the present invention is not limited to this method, and, as in the first embodiment, the rotation angle may be calculated by performing a correlation operation between the image data of photographed frames after and before the exposure operation.

In the second embodiment, an angular velocity sensor is disclosed as the sensor for detecting the rotation direction and rotation angle of the camera. Alternatively, as the sensor, not only the angular velocity sensor, but also an acceleration sensor may be used.

The angular velocity sensor used in the second embodiment and a sensor for detecting and preventing blurring of the camera may also be used, so that a cost/performance ratio may be increased.

According to the second embodiment of the present invention described above, information related to a rotation direction of panoramic photographing can be recorded on the recording medium 33 with a simple operation. In addition, since the rotation angle of the camera can be correctly determined, users of all skill levels can easily perform panoramic photographing with a simple operation.

In each of the first and second embodiments, when the data corresponding to the rotation direction of the camera in panoramic photographing is to be recorded on the recording medium 33 as header information for each photographed image, information related to the rotation direction is manually set or automatically determined by an angular velocity sensor. The rotating direction is not limited to the directions, described above as the rotating direction may be set to be a predetermined direction, e.g., a closing direction of a tripod screw for fixing the camera.

According to the embodiments of the present invention, there can be provided a provide a compact and inexpensive electronic photographing device which can be used in panoramic photographing, such that image editing such as erasing a panoramic image recorded on a recording medium of the camera, downloading image information stored in the recording medium into an external memory device, or printing the image information stored in the recording medium to a printer can be easily performed.

In this invention, it is apparent that various working embodiments can be formed on this basis of this disclosure without departing from the spirit and scope of the invention. This invention is not restricted by any specific embodiment expect being limited by the appended claims.

What is claimed is:

1. An electronic photographing device in which image information corresponding to a set of images photographed in panoramic photographing mode can be recorded on a recording medium in a fixed sequence and wherein each image in the set includes management information, said device comprising:

rotation direction setting means for setting information corresponding to a rotation direction of said electronic photographing device during the panoramic photographing of said set of images;

rotation direction recording means for recording information corresponding to the rotation direction set by the rotation direction setting means on said recording medium;

a first control means for controlling an arrangement of the set of panoramic images on the basis of the information corresponding to the rotation direction recorded on said recording medium;

display means for displaying the panoramic images arranged by said control means and for displaying editing information for editing the panoramic images; and a second control means for performing an editing operation based upon the editing information displayed on said display means, wherein the editing operation includes erasing a selected recorded image from the set of panoramic images, separating the set of panoramic images into a plurality of panoramic image subsets determined according to a position of the erased image in the set, and updating the management information of the remaining images which constitute the plurality of separated panoramic image subsets.

2. An electronic photographing device according to claim 1, wherein the device cancels a designation that an image in one of the plurality of image subsets is a panoramic image when said one of the plurality of image subsets contains only one image.

3. An electronic photographing device for recording on a recording medium a plurality of images including a set of images photographed in panoramic mode and for processing the plurality of recorded images, said device comprising:

a camera having a body and capable of photographing in at least a panoramic mode, the camera body including:

a display element including a display screen for displaying a recorded image and displaying at least one of a visual representation of an active photographing mode of the camera and an indication of at least one processing operation which may be performed on the displayed image;

a plurality of operation elements for selecting a processing operation to be performed on a selected recorded image in accordance with the processing operations displayed on the display screen; and a control element for performing a processing operation selected with the operation elements;

wherein the control element includes a warning generator which generates a warning to be displayed on the display element when the selected operation is the erasing operation and the selected image to be erased is an image of the set of panoramic images.

4. An electronic photographing device according to claim 3, wherein the camera further comprises a mode selector for switching between the panoramic photographing mode and other operating modes.

5. An electronic photographing device according to claim 3, wherein the display element is capable of simultaneously displaying more than one of the plurality of recorded images.

6. An electronic photographing device according to claim 3, wherein the operation elements select an image from the plurality of recorded images on which a selected processing operation is to be performed.

7. An electronic photographing device according to claim 3, wherein when the selected image on which the selected process is to be performed is an image of the set of panoramic images, the control element performs the selected process on all the images in the set.

8. An electronic photographing device according to claim 3, wherein:

the at least one processing operation which may be performed on a selected image includes at least one of an erasing operation, an image protect operation, a protect cancel operation, a download operation, and a print operation, the image protect operation inhibits the reading or alteration of the selected image, the download operation downloads the selected image from the recording medium to an external storage device, and the print operation causes the selected image to be printed on an external printer.

9. An electronic photographing device for recording on a recording medium a plurality of images including a set of images photographed in panoramic mode and for processing the plurality of recorded images, said device comprising:

a camera having a body and capable of photographing in at least a panoramic mode, the camera body including:

a display element including a display screen for displaying a recorded image and displaying on the displayed image at least one of a visual representation of an active photographing mode of the camera and an indication of at least one processing operation which may be performed on the displayed image;

a plurality of operation elements for selecting a processing operation to be performed on a selected recorded image in accordance with the processing operations displayed on the display screen; and a control element for performing a processing operation selected with the operation elements, wherein:

the at least one processing operation which may be performed on a selected image includes at least one of an erasing operation, an image protect operation, a protect cancel operation, a download operation, and a print operation, the image protect operation inhibits the reading or alteration of the selected image, the download operation downloads the selected image from the recording medium to an external storage device, and the print operation causes the selected image to be printed on an external printer, and when the selected operation is the erasing operation and the selected image to be erased is an image of the set of panoramic images, the control element provides information to the recording medium which divides the set of panoramic images into two subsets of panoramic images, the two subsets containing the remaining images in the set after erasure of the selected image.

10. An electronic photographing device according to claim 9, wherein when one of the two subsets contains only one image, the information provided to the recording medium from the control element includes information that the one image in the one subset is no longer a panoramic image.

11. An electronic photographing device in which image information corresponding to a set of images photographed in panoramic photographing mode can be recorded on a recording medium in a fixed sequence and wherein each image in the set includes management information, said device comprising:

a direction setting unit for setting information corresponding to a rotation direction of said electronic photographing device during the panoramic photographing of said set of images;

a recording unit for recording information corresponding to the rotation direction set by the direction setting unit on said recording medium;

a first controller for controlling an arrangement of the set of panoramic images on the basis of the information corresponding to the rotation direction recorded on said recording medium;

a display for displaying the panoramic images arranged by said controller and for displaying editing information for editing the panoramic images; and a second controller for performing an editing operation based upon the editing information displayed on said display, wherein the editing operation includes:

erasing a selected recorded image from the set of panoramic images, separating the set of panoramic images into a plurality of panoramic image subsets determined according to a position of the erased image in the set, and updating the management information of the remaining images which constitute the plurality of separated panoramic image subsets.

12. An electronic photographing device in which image information corresponding to a set of images photographed in panoramic photographing mode can be recorded on a recording medium in a fixed sequence and wherein each image in the set includes management information, said device comprising:

a rotation direction setting system for setting information corresponding to a rotation direction of said electronic photographing device during the panoramic photographing of said set of images;

a rotation direction recording system for recording information corresponding to the rotation direction set by the rotation direction setting system on said recording medium;

a first control system for controlling an arrangement of the set of panoramic images on the basis of the information corresponding to the rotation direction recorded on said recording medium;

a display system for displaying the panoramic images arranged by said control system and for displaying editing information for editing the panoramic images; and a second control system for performing an editing operation based upon the editing information displayed on said display system, wherein the editing operation includes erasing a selected recorded image from the set of panoramic images, separating the set of panoramic images into a plurality of panoramic image subsets determined according to a position of the erased image in the set, and updating the management information of the remaining images which constitute the plurality of separated panoramic image subsets.

13. An electronic photographing device according to claim 12, wherein the device cancels a designation that an image in one of the plurality of image subsets is a panoramic image when said one of the plurality of image subsets contains only one image.

* * * * *

UNITED STATES PATENT AND TRADEMARK OFFICE
CERTIFICATE OF CORRECTION

PATENT NO. : 6,661,455 B1
DATED : December 9, 2003
INVENTOR(S) : Toyofuku et al.

It is certified that error appears in the above-identified patent and that said Letters Patent is hereby corrected as shown below:

<u>Title page,</u>
Item [73], Assignee, should read as follows:

-- [73]  Assignee: Olympus Optical Co., Ltd. (JP) and
                      Sanyo Electric Co., Ltd. (JP) --

Signed and Sealed this

Twenty-ninth Day of June, 2004

JON W. DUDAS
*Acting Director of the United States Patent and Trademark Office*